United States Patent
Smith et al.

(10) Patent No.: US 9,351,112 B2
(45) Date of Patent: *May 24, 2016

(54) METHOD AND SYSTEM FOR PROVIDING ENHANCED LOCATION BASED INFORMATION FOR WIRELESS HANDSETS

(71) Applicant: RIVADA RESEARCH, LLC., Colorado Springs, CO (US)

(72) Inventors: Clint Smith, Warwick, NY (US); Purnima Surampudi, Bangalore (IN)

(73) Assignee: RIVADA RESEARCH, LLC, Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,790

(22) Filed: Aug. 25, 2015

(65) Prior Publication Data

US 2015/0382145 A1     Dec. 31, 2015

Related U.S. Application Data

(63) Continuation of application No. 14/690,713, filed on Apr. 20, 2015, now Pat. No. 9,173,065, which is a continuation-in-part of application No. 14/293,056, filed on Jun. 2, 2014, now Pat. No. 9,232,354, which is (Continued)

(51) Int. Cl.
  *H04W 24/00*   (2009.01)
  *H04W 4/02*   (2009.01)
  (Continued)

(52) U.S. Cl.
  CPC .............. *H04W 4/02* (2013.01); *G01S 5/0072* (2013.01); *G01S 5/0231* (2013.01); *G01S 5/0263* (2013.01);
  (Continued)

(58) Field of Classification Search
  CPC ..... H04W 4/021; H04W 4/023; H04W 4/025; H04W 64/00; H04W 4/02; H04W 4/22
  USPC ................ 455/404.1, 404.2, 418–420, 422.1, 455/435.1, 436, 440, 441, 456.1–456.6, 457
  See application file for complete search history.

(56) References Cited

U.S. PATENT DOCUMENTS

| | | |
|---|---|---|
| 7,764,231 B1 | 7/2010 | Karr et al. |
| 8,320,931 B2 | 11/2012 | Ward et al. |

(Continued)

FOREIGN PATENT DOCUMENTS

| | | |
|---|---|---|
| CN | 1688892 A | 10/2005 |
| CN | 101305567 A | 11/2008 |

(Continued)

OTHER PUBLICATIONS

Mexican Office Action Issued by the Mexican Patent Office for Mexican Application No. MX/a/2014/001745 on May 19, 2015.

(Continued)

*Primary Examiner* — Nhan Le
(74) *Attorney, Agent, or Firm* — The Marbury Law Group, PLLC

(57) ABSTRACT

Methods, devices and systems for generating enhanced location information on or about a mobile device may include hybrid lateration and trilateration solutions in which the mobile device performs location determination calculations with the aid of network components or global positioning systems (GPS). Mobile devices may automatically form groups based on proximity and/or may be grouped together via a network server. Mobile devices in a group may share computed location information and/or information collected from internal sensors with other grouped mobile devices. Information shared between grouped mobile devices may be used to enhance the location information computed on each mobile device. For example, each mobile device may supplement and/or augment previously computed location information based on the received location information and/or relative positions of other mobile devices in the same group. Each mobile device may also utilize local sensors to further enhance their location information.

36 Claims, 33 Drawing Sheets

Related U.S. Application Data a continuation of application No. 13/585,125, filed on Aug. 14, 2012, now Pat. No. 8,787,944.

(60) Provisional application No. 61/575,300, filed on Aug. 18, 2011, provisional application No. 61/573,636, filed on Sep. 9, 2011.

(51) Int. Cl.

| | | |
|---|---|---|
| *G01S 5/02* | (2010.01) | |
| *H04W 64/00* | (2009.01) | |
| *G01S 19/48* | (2010.01) | |
| *G01S 5/00* | (2006.01) | |
| *H04W 4/22* | (2009.01) | |
| *H04M 1/725* | (2006.01) | |

(52) U.S. Cl.
CPC ............ *G01S 5/0284* (2013.01); *G01S 5/0289* (2013.01); *G01S 5/0294* (2013.01); *G01S 19/48* (2013.01); *H04M 1/72538* (2013.01); *H04M 1/72572* (2013.01); *H04W 4/023* (2013.01); *H04W 4/027* (2013.01); *H04W 4/22* (2013.01); *H04W 64/00* (2013.01)

(56) References Cited

U.S. PATENT DOCUMENTS

| | | | |
|---|---|---|---|
| 8,359,643 B2 | 1/2013 | Low et al. | |
| 8,566,022 B1 | 10/2013 | Starenky et al. | |
| 8,639,267 B2 | 1/2014 | Johnson | |
| 8,849,305 B2 | 9/2014 | Oka et al. | |
| 8,977,284 B2 | 3/2015 | Reed | |
| 2005/0059379 A1* | 3/2005 | Sovio .................. | H04L 63/0492 455/411 |
| 2007/0232319 A1 | 10/2007 | Bells et al. | |
| 2007/0275730 A1 | 11/2007 | Bienas et al. | |
| 2009/0047973 A1 | 2/2009 | MacNaughtan et al. | |
| 2009/0079622 A1 | 3/2009 | Seshadri et al. | |
| 2009/0149202 A1 | 6/2009 | Hill et al. | |
| 2009/0204457 A1* | 8/2009 | Buhrmann ......... | G06Q 20/4014 455/410 |
| 2010/0062792 A1 | 3/2010 | Han et al. | |
| 2010/0159879 A1* | 6/2010 | Salkini .................. | H04W 12/08 455/411 |
| 2011/0009130 A1 | 1/2011 | Wu | |
| 2011/0124347 A1 | 5/2011 | Chen et al. | |
| 2011/0151892 A1 | 6/2011 | Vengroff et al. | |
| 2011/0171973 A1 | 7/2011 | Beck et al. | |
| 2011/0227788 A1 | 9/2011 | Lundgren et al. | |
| 2011/0276556 A1 | 11/2011 | Meier et al. | |
| 2012/0286997 A1 | 11/2012 | Lin et al. | |
| 2014/0335897 A1* | 11/2014 | Clem .................... | G08G 1/0112 455/456.3 |
| 2015/0230055 A1* | 8/2015 | Smith .................... | H04W 64/00 455/456.3 |

FOREIGN PATENT DOCUMENTS

| | | |
|---|---|---|
| CN | 101720058 A | 6/2010 |
| JP | 2005331423 A | 12/2005 |
| JP | 201069910 A | 4/2010 |
| WO | 2004008171 A1 | 1/2004 |
| WO | 2011037214 A1 | 3/2011 |

OTHER PUBLICATIONS

Japanese Office Action Issued by the Japanese Patent Office for Japanese Application No. 2014-526179 on May 12, 2015 corresponding to PCT/US2012/050981.

Russian Office Action Issued by the Russian Patent Office for Russian Application No. 2014109421/07(014916) on May 16, 2015 corresponding to PCT/US2012/050981.

Chinese Office Action Issued by the Chinese Patent Office for Chinese Application No. 201280050710.4 on Mar. 20, 2015.

Communication Pursuant to Rules 70(2) and 70a(2) EPC Issued by the European Patent Office for European Application No. 12824068.6-1812 on Mar. 5, 2015.

Extended European Search Report Issued by the European Patent Office for European Application No. 12824068.6-1812 on Feb. 16, 2015.

First Office Action Issued by State Intellectual Property Office for Chinese Application No. 201280050710.4 on Oct. 31, 2014.

International Preliminary Report on Patentability and Written Opinion for PCT/US2012/050981 issued Feb. 18, 2014.

Zyren, "Overview of the 3GPP Long Term Evolution Physical Layer", Freescale Semiconductor, 3GPPEVOLUTIONWPP, pp. 1-27, (Jul. 2007).

Keithley, "OFDM/MIMO Master Class Understanding the Physical Layer Principles of WLAN, WiMAX and LTE", www.keithley.com, pp. 1-119, (2004).

Xiong et al., "SecureAngle: Improving Wireless Security Using Angle-of-Arrival Information", Hotnets, pp. 1-6, (Oct. 20-21, 2010).

3GPP, "3rd Generation Partnership Project: Technical Specification Group Radio Access Network: Evolved Universal Terrestial Radio Access Network (E-UTRAN); Stage 2 functional specification of User Equipment (US) positioning in E- UTRAN (Release 9)", 3GPP TS 36.305, V9.3.0, pp. 1-52, (Jun. 2010).

MultiService Forum, MSF Whitepaper on Location Services in LTE Networks, MultiService Forum, MSF-TR-services-005-FINAL, pp. 1-19, (2009).

"Comments of Motorola Mobility, Inc. and Motorola Solutions, Inc." before the Federal Communications Commission, Washington, DC 20554, Matter of Wireless E911 Location Accuracy Requirements vs. E911 Requirements for IP-Enabled Service Providers, pp. 1-20, (Jan. 19, 2011).

3GPP, "3rd Generation Partnership Project; Technical Specification Group Core Network; Universal Geographical Area Description (GAD), (Release 1999)", 3G TS 23.032, V3.1.0, pp. 1-29, (Mar. 2000).

3GPP, "LTE; Evolved Universal Terrestrial Radio Access (E-UTRA); Physical layer procedures (3GPP TS 36.213 version 10.1.0 Release 10)", ETSI TS 136 213 V 10.1.0. pp. 1-117 (Apr. 2011).

3GPP, "LTE; Evolved Universal Terrestrial Radio Access (E-UTRA); LTE Positioning Protocol (LPP), (3GPP TS 36.355 version 10.1.0 Release 10)", ETSI TS 136 355 V10.1.0. pp. 1-115 (Jan. 2011).

3GPP, LTE, NAS Signaling for Control Plane LCS in Evolved Packet System (EPS), (2GPP TS 24.171 version 9.0.0 Release 9), ETSI TS 124 171, V9.0.0, pp. 1-19, (Apr. 2010).

International Search Report and Written Opinion issued in PCT Application No. PCT/US2012/050981, mailed on Jan. 29, 2013.

\* cited by examiner

METHOD AND SYSTEM FOR PROVIDING ENHANCED LOCATION BASED INFORMATION FOR WIRELESS HANDSETS

RELATED APPLICATIONS

This application is a continuation of U.S. patent application Ser. No. 14/690,713 entitled "Method and System for Providing Enhanced Location Based Information for Wireless Handsets" filed on Apr. 20, 2015, which is a continuation in part of U.S. patent application Ser. No. 14/293,056 entitled "Method and System for Providing Enhanced Location Based Information for Wireless Handsets" filed on Jun. 2, 2014, which is a continuation of U.S. patent application Ser. No. 13/585,125 entitled "Method and System for Providing Enhanced Location Based Information for Wireless Handsets" filed Aug. 14, 2012, and which claims the benefit of priority of U.S. Provisional Application No. 61/575,300, entitled "Method and System for Providing Enhanced Location Based Information for Wireless Handsets" filed Aug. 18, 2011, and U.S. Provisional Application No. 61/573,636, entitled "Method and System for Providing Enhanced Location Based Information for Wireless Handsets" filed Sep. 9, 2011, the entire contents of all of which are hereby incorporated by reference.

FIELD OF INVENTION

The present application relates generally to a wireless mobile communication system, and more particularly to methods and systems that provide enhanced location information for wireless mobile devices.

BACKGROUND

Wireless communication technologies and mobile electronic devices (e.g., cellular phones, tablets, laptops, etc.) have grown in popularity and use over the past several years. To keep pace with increased consumer demands, mobile electronic devices have become more powerful and feature rich, and now commonly include global positioning system (GPS) receivers, sensors, and many other components for connecting users to friends, work, leisure activities and entertainment. However, despite these advancements, mobile devices remain lacking in their ability to provide effective location based services, information, or communications. As mobile devices and technologies continue to grow in popularity and use, generating enhanced location information for mobile devices is expected to become an important and challenging design criterion for mobile device manufactures and network engineers.

SUMMARY

The methods and apparatuses of various embodiments provide devices, circuits and methods for precise location determination in multi-technology communications devices. Embodiment methods may include determining, by a processor of the mobile device, an initial position of the mobile device, generating local position information, generating external position information based on location information received from an external location tracking system; generating proximity position information based on distance information received via the antenna from a second mobile device, generating final location information based on the determined initial position, the generated local position information, the generated external position information, and the generated proximity position information, and using the generated final location information set to provide a location based service.

In some embodiments, the final location estimation set may include a position, a velocity and an acceleration, each having a latitude component, a longitude component, and an altitude component. In such embodiments, generating any of the local position information, the external position information, or the proximity position information may further include separating, by the processor, location information into a set of latitude components, a set of longitude components, and a set of altitude components; and executing, by the processor, a kalman filter on each of the set of latitude components, the set of longitude components, and the set of altitude components to produce position information. Such embodiments may include, determining an error associated with generation of the position information.

Some embodiments may include, updating the local position information after a predetermined time interval to produce updated local position information; updating the external position information after a predetermined time interval to produce updated external position information; and updating proximity position information after a predetermined time interval to produce updated proximity position information. Such embodiments may include updating the final location estimation set based on the updated local position information, the updated external position information, the updated proximity position information and the final location estimation set to produce an updated final location estimation set. Alternatively, in such embodiments, updating any of the local position information, external position information, or proximity position information may include determining whether updated location information or updated distance information is available, combining current location information or current distance information with an error value, in response to determining that updated location information or updated distance information is not available. In another alternative of such embodiments, the predetermined interval may be a time interval between successive determinations of the local position information.

In some embodiments, the distance information may comprise a distance from the mobile device to the second mobile device.

In some embodiments, the local position information may be obtained using dead reckoning.

In some embodiments, local position information may be obtained using combination of local sensor outputs.

In some embodiments, the external location tracking system may be a global positioning (GPS).

Embodiments include a multi-technology communication device having one or more processors or processor cores configured with processor-executable instructions to perform operations of one or more of the embodiment methods described above.

Embodiments include a non-transitory processor-readable medium having stored thereon processor-executable software instructions to cause a processor to perform operations of one or more of the embodiment methods described above.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
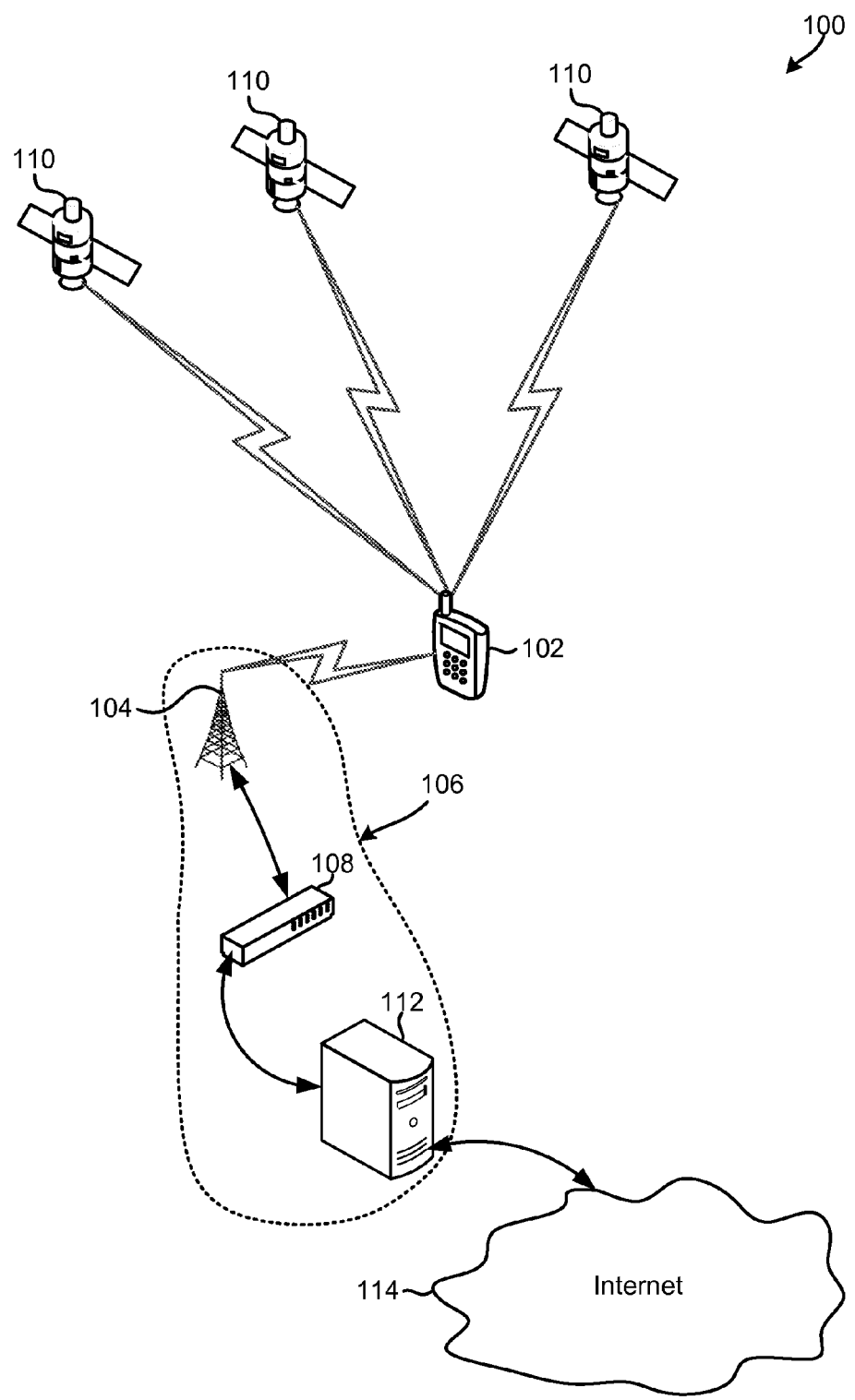
FIG. 1 is a communication system block diagram illustrating network components of an example telecommunication system suitable for use in a mobile-device centric approach for determining the location of a mobile device in accordance with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "cellular telephone," and "cell phone" are used interchangeably herein to refer to any one or all of cellular telephones, smartphones, personal data assistants (PDA's), laptop computers, tablet computers, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals. While the various embodiments are particularly useful in mobile devices, such as cellular telephones, which have limited battery life, the embodiments are generally useful in any computing device that may be used to wirelessly communicate information.

The terms "wireless network", "network", "cellular System", "cell tower" and "radio access point" may used generically and interchangeably to refer to any one of various wireless mobile systems. In an embodiment, wireless network may be a radio access point (e.g., a cell tower), which provides the radio link to the mobile device so that the mobile device can communicate with the core network.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), and land mobile radio (LMR). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

A number of different methods, technologies, solutions, and/or techniques (herein collectively "solutions") are currently available for determining the location of mobile device, any or all of which may be implemented by, included in, and/or used by the various embodiments. Such solutions include, e.g., global positioning system (GPS) based solutions, assisted GPS (A-GPS) solutions, and cell-based positioning solutions such as cell of origin (COO), time of arrival (TOA), observed time difference of arrival (OTDOA), advanced forward link trilateration (AFLT), and angle of arrival (AOA). In various embodiments, such solutions may implemented in conjunction with one or more wireless communication technologies and/or networks, including wireless wide area networks (WWANs), wireless local area networks (WLANs), wireless personal area networks (WPANs), and other similar networks or technologies. By way of example, a WWAN may be a Code Division Multiple Access (CDMA) network, a Frequency Division Multiple Access (FDMA) network, an OFDMA network, a 3GPP LTE network, a WiMAX (IEEE 802.16) network, and so on. The WPAN may be a Bluetooth network, an IEEE 802.15x network, and so on. A WLAN may be an IEEE 802.11x network, and so on. A CDMA network may implement one or more radio access technologies (RATs) such as CDMA2000, Wideband-CDMA (W-CDMA), and so on.

Various embodiments discussed herein may generate, compute, and/or make use of location information pertaining to one or more mobile devices. Such location information may be useful for providing and/or implementing a variety of location-based services, including emergency location services, commercial location services, internal location services, and lawful intercept location services. By way of example: emergency location services may include services relating to the provision of location and/or identification information to emergency service personal and/or emergency systems (e.g., to 911 system); commercial location services may include any general or value-added service (e.g., asset tracking services, navigation services, location-based advertising services, etc); internal location services may include services pertaining to the management of the wireless service provider network (e.g., radio resource management services, message delivery services, paging services, call delivery services, services for providing position/location network enhancements, etc.); and lawful intercept location services may include any service that provides public safety and/or law enforcement agencies with identification and/or location information pertaining to a mobile device or a mobile device user. While the various embodiments are particularly useful in applications that fall within one or more of the categories/types of location based services discussed above, the embodiments are generally useful in any application or service that benefits from location information.

Modern mobile electronic devices (e.g., mobile phones) typically include one or more geospatial positioning systems/components for determining the geographic location of the mobile device. Location information obtained by these geospatial systems may be used by location-aware mobile software applications (e.g., Google® Maps, Yelp®, Twitter® Places, "Find my Friends" on Apple®, etc.) to provide users with information regarding the mobile device's physical location at a given point in time. In recent years, such location-based services and software applications have increased in popularity and use, and now enable mobile device users to navigate cities, read reviews of nearby restaurants and services, track assets or friends, obtain location-based safety advice, and/or take advantage of many other location-based services on their mobile devices.

Consumers of modern mobile devices now demand more advanced, robust, and feature-rich location-based services than that which is currently available on their mobile devices. However, despite many recent advances in mobile and wireless technologies, mobile devices remain lacking in their ability to provide their users/consumers with location based services that are accurate or powerful enough to meet the demands of these consumers. For example, while existing location-aware mobile software applications (e.g., "Find my Friends" on Apple®, Google® Latitude, etc.) enable a mobile device user to view the approximate geographical position of other mobile devices on a two-dimensional map, they lack the capability to accurately, efficiently and consistently pin point the precise location and/or position of the other mobile devices in all three dimensions and/or within a wireless communication network. The various embodiments overcome these and other limitations of existing solutions by collecting information from multiple mobile devices, generating more precise location information on or about one or more mobile devices, generating advanced three-dimensional location and position information on or about one or more mobile devices, and using the generated location/position information to provide mobile device users with more accurate, more powerful, and more reliable location based services.

One of the challenges associated with using geo-spatial positioning technology on a mobile device is that the mobile device's ability to acquire satellite signals and navigation data to calculate its geospatial location (called "performing a fix") may be hindered when the mobile device is indoors, below grade, and/or when the satellites are obstructed (e.g., by tall buildings, etc.). The presence of physical obstacles, such as metal beams or walls, may cause multipath interference and signal degradation of the wireless communication signals when the mobile device is indoors or in urban environments that include tall buildings or skyscrapers. In rural environments, the mobile device may not have sufficient access to satellite communications (e.g., to a global positioning system satellite) to effectively ascertain the mobile device's current location. These and other factors often cause existing geospatial technologies to function inaccurately and/or inconsistently on mobile devices, and hinder the mobile device user's ability to fully utilize location-aware mobile software applications and/or other location based services and applications on his/her mobile device.

Another problem with using existing geo-spatial positioning technologies is that position accuracy afforded by existing technologies is not sufficient for use in emergency services due to the relatively high level of position accuracy required by these services.

The various embodiments include improved location determination solutions that determine the location of a mobile device at the level of position accuracy which is suitable for use in emergency location services, commercial location services, internal location services, and lawful intercept location services.

Generally, there are three basic approaches for determining the location of mobile devices in a communication network: a mobile-device centric approach, a network centric approach and a hybrid approach that may include aspects of both the mobile device centric approach and the network centric approach.

FIG. 1 illustrates an example communication system 100 suitable for implementing a mobile-device centric approach for determining the location of a mobile device 102 in accordance with various embodiments. The mobile device 102 may include a global positioning system (GPS) receiver in communication with multiple geo-spatial positioning and navigation satellites 110 and a base tower 104 of a communication network 106. The mobile device 102 may receive (e.g., via the GPS receiver) radio signals emitted by the satellites 110, measure the time required for the signals to reach the mobile device 102, and use trilateration techniques to determine the geographical coordinates (e.g., latitude and longitude coordinates) of the mobile device 102. The mobile device 102 may send the geographical coordinates to the communication network 106 at various times and/or in response to various conditions or events, such as upon initial acquisition with the communication network 106, in response to network-based requests, in response to third party requests, etc.

In an embodiment, the communication network may be a cellular telephone network. A typical cellular telephone network includes a plurality of cellular base stations 104 coupled to a network operations center 108, which operates to connect voice and data calls between mobile devices 102 (e.g., mobile phones) and other network destinations, such as via telephone land lines (e.g., a POTS network, not shown) and the Internet 114. Communications between the mobile devices 102 and the cellular telephone network 11 may be accomplished via two-way wireless communication links, such as 4G, 3G, CDMA, TDMA, and other cellular telephone communication technologies. The network 106 may also include one or more servers 112 coupled to or within the network operations center 108 that provide connections to the Internet 114.

In various embodiments, the mobile device 102 may be configured to communicate with a radio access node, which can include any wireless base station or radio access point such as LTE, CDMA2000/EVDO, WCDMA/HSPA, IS-136, GSM, WiMax, WiFi, AMPS, DECT, TD-SCDMA, or TD-CDMA and switch, Land Mobile Radio (LMR) interoperability equipment, a satellite Fixed Service Satellite (FSS) for remote interconnection to the Internet and PSTN.

Figure 2:
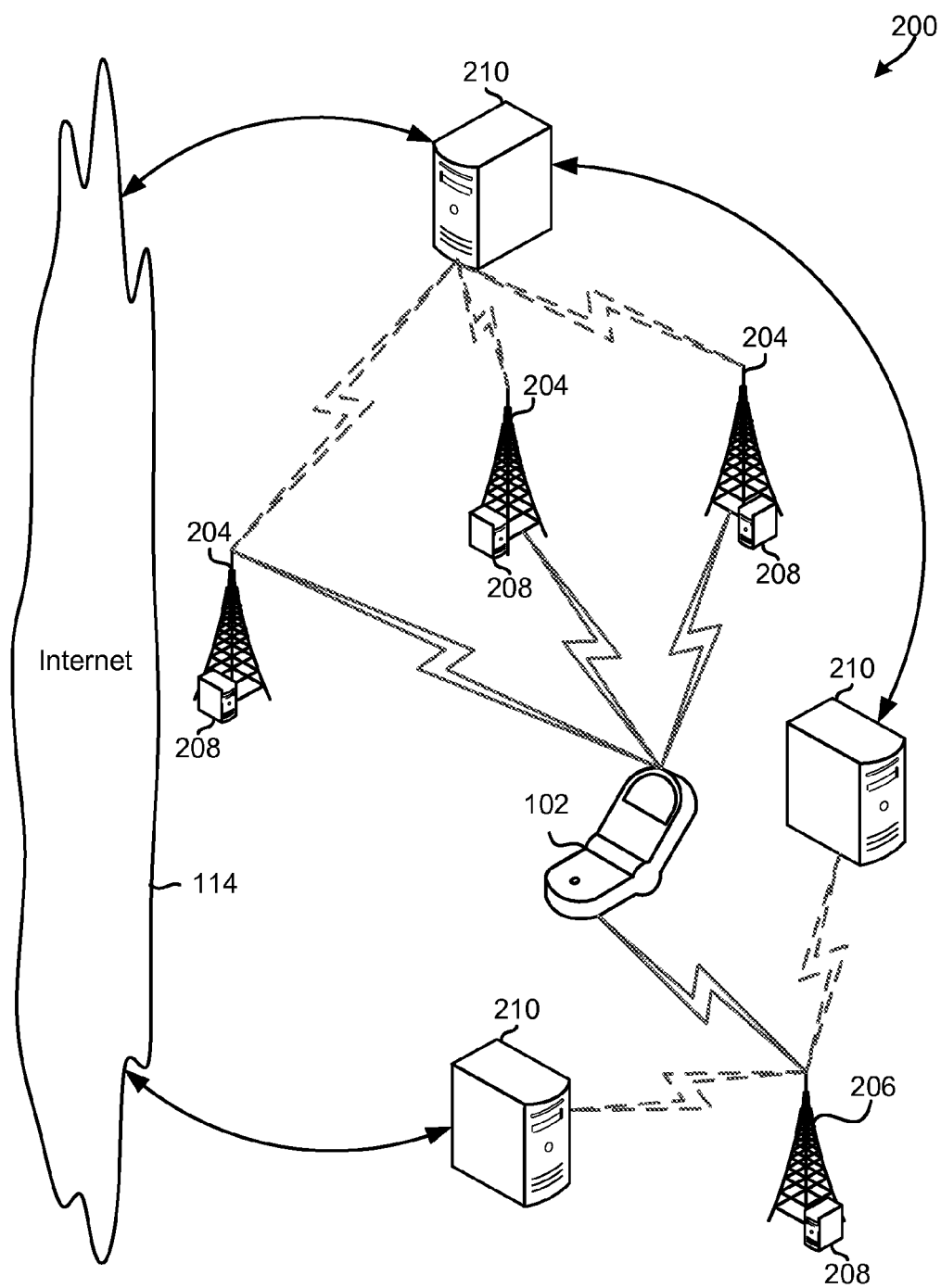
FIG. 2 is a communication system block diagram illustrating network components of an example telecommunication system suitable for use in a network centric approach for determining the location of a mobile device in accordance with various embodiments.

FIG. 2 illustrates an example communication system 200 suitable for implementing a network centric approach for determining the location of a mobile device 102 in accordance with various embodiments. The mobile device 102 may include a circuitry for wirelessly sending and receiving radio signals. The communication system 200 may include a plurality of radio access points 204, 206 having installed thereon additional radio equipment 208 for measuring the location of the mobile devices in the communication system. For example, the mobile device 102 may transmit radio signals for reception by one or more (e.g., typically three) radio access points 204, and the radio access points may receive the transmitted signals and measure the signal strength and/or radio energy of the received signals to identify the location of the mobile device 102.

In an embodiment, the radio access points 204 may be configured to determine the location of the mobile device relative to a known location of a network component, such as the illustrated radio access point 206. In this manner, the additional radio equipment 208 installed on the radio access points 204, 206 provides the communication system 200 with similar functionality as is provided by a GPS receiver for signals received from the mobile device. For example, the radio equipment on one or more of the radio access points 204 may measure how long it takes for the radio signal to travel from the mobile device 102 to another radio access point 206, and using trilateration techniques (e.g., time of arrival, angle of arrival, or a combination thereof), the mobile device 102 or a network server 210 may estimate the location of the mobile device 102 to within an accuracy of 100 to 300 meters. Once the network has estimated the latitude and longitude coordinates of the mobile device 102, this information may be used to determine the geo-spatial location of the mobile device 102, which may be communicated to other systems, servers or components via the Internet 114.

Various embodiments may implement and/or make use of a hybrid approach for determining the location of mobile devices in a communication network, which may include aspects of both the device-centric and the network-centric approaches discussed above with reference to FIGS. 1 and 2. For example, an embodiment system, mobile device or network component (e.g., severs, radio access points, etc.) may be configured to implement a hybrid approach in which dead reckoning (also known as "deduced reckoning") techniques, GPS capabilities of the mobile device, and mobile-to-mobile (i.e., mobile device to mobile device) trilateration to produce position estimates of increased accuracy. In another embodiment, the system, devices and/or components may be configured to implement a hybrid approach in which the GPS capabilities of mobile devices, the measured signal strengths and/or radio energy of radio signals transmitted from the mobile devices, and known locations of network components may be used in combination to estimate the locations of one or more mobile devices in the network. In a further embodiment, system, devices and/or components may be configured to dynamically determine the factors (e.g., radio signal strength, GPS, etc.) to measure and/or use in determining the location of the mobile devices.

Figure 3:
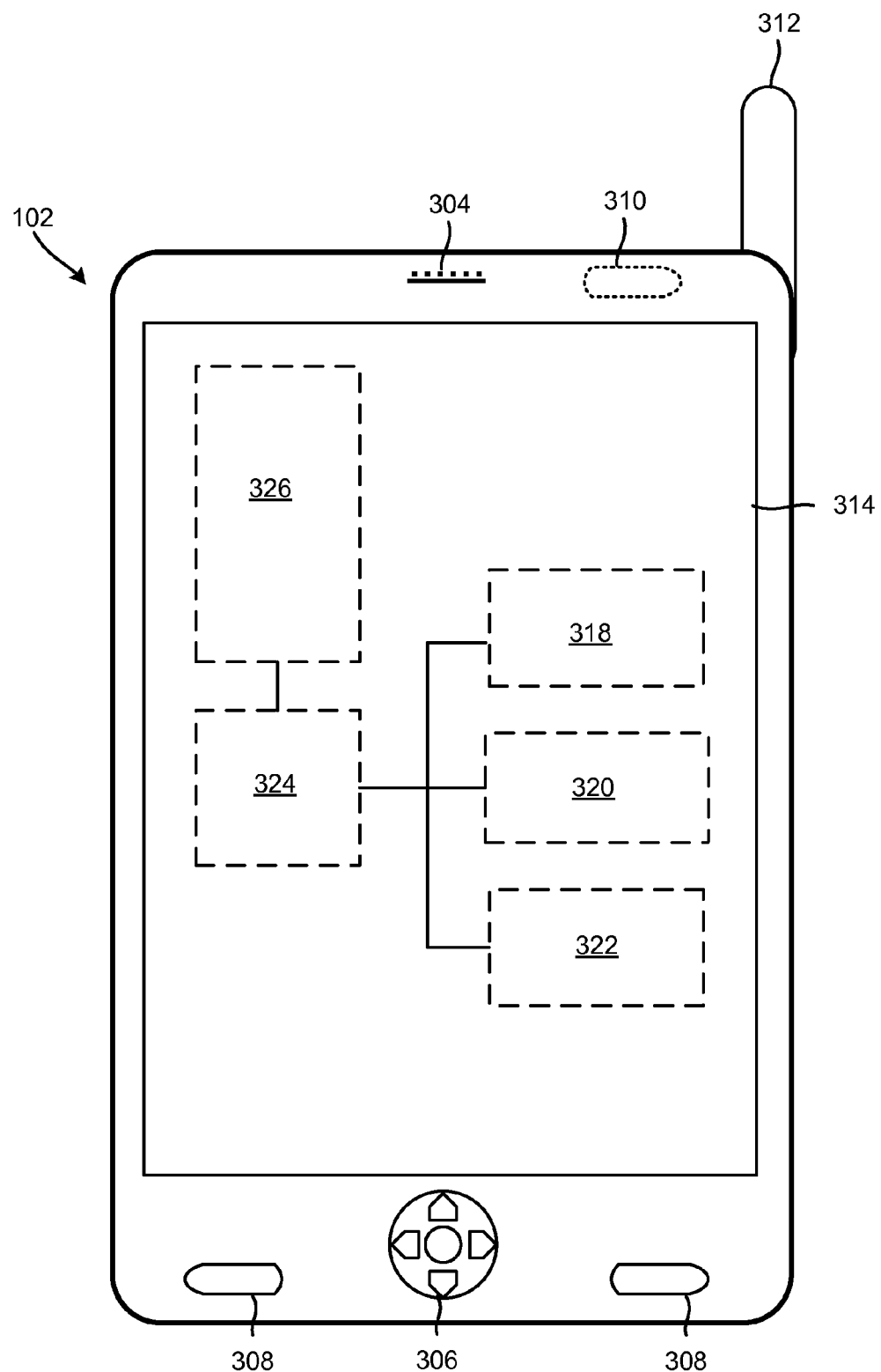
FIG. 3 is an illustration of an example mobile device suitable for use in grouping with other mobile devices and computing precise location information in accordance with the various embodiments.

FIG. 3 illustrates sample components of a mobile device 102 in the form of a phone that may be used with the various embodiments. The phone may include a speaker 304, user input elements 306, microphones 308, an antenna 312 for sending and receiving electromagnetic radiation, an electronic display 314, a processor 324, a memory 326 and other well known components of modern electronic devices.

The phone may also include one or more sensors 310 for monitoring physical conditions (e.g., location, motion, acceleration, orientation, altitude, etc.). The sensors may include any or all of a gyroscope, an accelerometer, a magnetometer, a magnetic compass, an altimeter, an odometer, and a pressure sensor. The sensors may also include various bio-sensors (e.g., heart rate monitor, body temperature sensor, carbon sensor, oxygen sensor, etc.) for collecting information pertaining to environment and/or user conditions. The sensors may also be external to the mobile device and paired or grouped to the mobile device via a wired or wireless connection (e.g., Bluetooth®, etc.). In embodiment, the mobile device 102 may include two or more of the same type of sensor (e.g., two accelerometers, etc.).

The phone may also include a GPS receiver 318 configured to receive GPS signals from GPS satellites to determine the geographic location of the phone. The phone may also include circuitry 320 for transmitting wireless signals to radio access points and/or other network components. The phone may further include other components/sensors 322 for determining the geographic position/location of the phone, such as components for determining the radio signal delays (e.g., with respect to cell-phone towers and/or cell sites), performing trilateration and/or multilateration operations, identifying proximity to known networks (e.g., Bluetooth® networks, WLAN networks, WiFi, etc.), and/or for implementing other known geographic location technologies.

The phone may also include a system acquisition function configured to access and use information contained in a subscriber identity module (SIM), universal subscriber identity module (USIM), and/or preferred roaming list (PRL) to, for example, determine the order in which listed frequencies or channels will be attempted when the phone is to acquire/connect to a wireless network or system. In various embodiments, the phone may be configured to attempt to acquire network access (i.e., attempt to locate a channel or frequency with which it can access the wireless/communication network) at initial power-on and/or when a current channel or frequency is lost (which may occur for a variety of reasons).

The phone may include pre-built in USIM, SIM, PRL or access point information. In an embodiment, the mobile device may be configured for first responders and/or public safety network by, for example, setting the incident radio system as the default and/or preferred communication system.

As mentioned above, despite recent advances in mobile and wireless communication technologies, determining the specific location of a mobile device 102 in a wireless network remains a challenging task for a variety of reasons, including the variability of environmental conditions in which mobile devices are often used by consumers, deficiencies in existing technologies for computing and/or measuring location information on mobile devices, and the lack of uniform standards. For example, there is currently no universally accepted standard for implementing or providing location-based services. As a result, mobile device designers and wireless network operators, in conjunction with local public safety and third party providers, are using a variety of inefficient, incoherent, and sometimes incompatible methods, technologies, solutions, and/or techniques to determine the location of a mobile device and/or to provide location based services.

While there are no universally accepted standards for implementing or providing location-based services, there are certain requirements or standards associated with determining the location of a mobile device that may be of use in various embodiments. The U.S. Congress has mandated that cellular service providers configure their networks, communication systems and/or mobile devices so that the locations of mobile devices can be determined when a 911 call is placed. To implement Congress's mandate, the Federal Communications Commission (FCC) requested cellular service providers upgrade their systems in two phases (herein "Phase I" and "Phase II" respectively). While the level of precision/accuracy provided by these Phase I and II upgrades are generally inadequate for providing effective location based services that meet the demands of modern users of mobile devices, these upgrades provide a foundation from which more effective location based solutions may be built.

As mentioned above, the FCC requested cellular service providers upgrade their systems in two phases. In the first phase (Phase I), cellular service providers were to upgrade their systems so that emergency calls (e.g., 911 calls) are routed to the public service answering point (PSAP) closest to the cell-tower antenna with which the mobile device is connected, and so that PSAP call-takers can view the phone number of the mobile device and the location of the connecting cell-tower. The location of the connecting cell-tower may be used to identify the general location of the mobile device within a 3-6 mile radius.

In the second phase (Phase II), cellular service providers were to upgrade their systems so that PSAP call-takers could identify the location of the mobile device to within 300 meters. To meet these Phase II requirements, wireless service providers have implemented a variety of technologies, and depending on the technology used, can generally identify the location of the mobile device to within 50-300 meters. For example, on systems that have implemented a network-based solution (e.g., triangulation of nearby cell towers, etc.), the location of a mobile device can be determined within an accuracy of 100 meters 67% of the time, and to within an accuracy of 300 meters 95% of the time. On systems that have adopted a mobile device-based solution (e.g., embedded global positioning system receivers, etc.), the location of the mobile device may be determined to within 50 meters 67% of the time, and to within 150 meters 95% of the time.

Existing phase I and II solutions, alone, are not adequate for generating location information having sufficient accuracy or detail for use in providing accurate, powerful, and reliable location based services. Various embodiments may use some or all of the capabilities built into existing systems (e.g., as part of phase I and II upgrades, device-centric systems, network-centric systems, etc.), in conjunction with more advanced location determination techniques, to compute location information suitable for the advanced location based services demanded by today's consumers.

In addition to the three basic approaches discussed above, a number of different solutions are currently available for determining the location of mobile device, any or all of which may be implemented by and/or included in the various embodiments.

Most conventional location determination solutions use distance estimation techniques that are based on single-carrier signals, and one of the fundamental operations in ground-based (or network-centric) location determination solutions is timing estimation of a first-arrival path of a signal. That is, a single-carrier signal transmitted between a transceiver and a mobile device can be received via multiple paths (i.e., multipath), and the multiple paths of the signal can have different received powers and arrival times. The received signal may be cross-correlated to distinguish the multiple paths of the received signal. In this method, it is generally assumed that the first-arrival path (e.g., first detected signal, strongest signal, etc.) is associated with the path traveling the shortest distance, and hence is the right value to use in estimating distance between the mobile device and the transceiver. Often, this first-arrival path is the strongest path due to zero or fewer reflections, relative to the other paths, between the transceiver and the mobile device.

In various embodiments, the first-arrival time of the identified first-arrival path may be used in addition to other parameters (e.g., an estimated signal transmission time and/or a time offset between clocks of the transceiver and the mobile device, etc.) to estimate distance between a mobile device and a network component (e.g., another mobile device, a transceiver, an access point, a base station, etc.). The first-arrival time may be estimated by the mobile device (e.g., based on the downlink received signal) or by the network component (e.g., based on an uplink received signal).

The location of the mobile device may also be determined by estimating the distance between the mobile device and a network component or other signal sources (e.g., a transceiver, ground or satellite-based signal sources, etc.). For example, the location of the mobile device may be determined by performing trilateration using estimated distances between multiple (e.g., three or more) transceivers and the mobile device.

Another location determination solution may include computing an observed time difference of arrival (OTDOA) value by measuring the timing of signals received from three network components (e.g., mobile devices, transceivers, access points, etc.). For example, a mobile device may be configured to compute two hyperbolas based on a time difference of arrival between a reference transceiver signal and signals of two neighbor transceivers. The intersection of the computed hyperbolas may define a position on the surface of the earth that may be used by various embodiments to determine the location of the mobile device.

The accuracy of such OTDOA solutions may be a function of the resolution of the time difference measurements and the geometry of the neighboring transceivers. As such, implementing an OTDOA solution may require determining the precise timing relationship between the neighboring transceivers. However, in existing asynchronous networks, this precise timing relationship may be difficult to ascertain.

In various embodiments, location measurement units (LMUs) may be added throughout a deployment region of an asynchronous network to measure/compute timing information for one or more network components (e.g., transceivers) relative to a high quality timing reference signal. For example, a mobile device or an LMU may determine the observed time difference between frame timing of transceiver signals, and the observed time difference may be sent to the transceiver or a radio network controller of the communication network to determine the location of the mobile device. The location of the mobile device may also be determined based on the observed time difference and assistance data (e.g., position of the reference and neighbor transceivers) received from the communication network.

Another location determination solution may include computing an uplink-time difference of arrival (U-TDOA) based on network measurements of the time of arrival of a known signal sent from the mobile device and received at multiple (e.g., four or more) LMUs. For example, LMUs may be positioned in the geographic vicinity of the mobile device to accurately measure the time of arrival of known signal bursts, and the location of the mobile device may be determined using hyperbolic trilateration based on the known geographical coordinates of the LMUs and the measured time-of-arrival values.

As discussed above, conventional location determination solutions are typically based on single-carrier signals. The various embodiments include a ground-based location determination solution based on multi-carrier signals. A location determination solution based on multi-carrier signals may improve the accuracy of the computed location information by, for example, improving the accuracy of the timing estimation (e.g., by expanding the bandwidth of cellular signals). Location determination solutions based on multiple carriers may be used in both the device-centric (e.g., mobile device-based) and network-centric (e.g., base station-based) approaches, and may be applied to both 3GPP and 3GPP2 wireless communication technologies.

In various embodiments, a mobile device may be configured to determine its geospatial location based on information collected from mobile device sensors (e.g. gyroscope, accelerometer, magnetometer, pressure sensor, etc.), information received from other mobile devices, and information received from network components in a communication system.

Figure 4A:
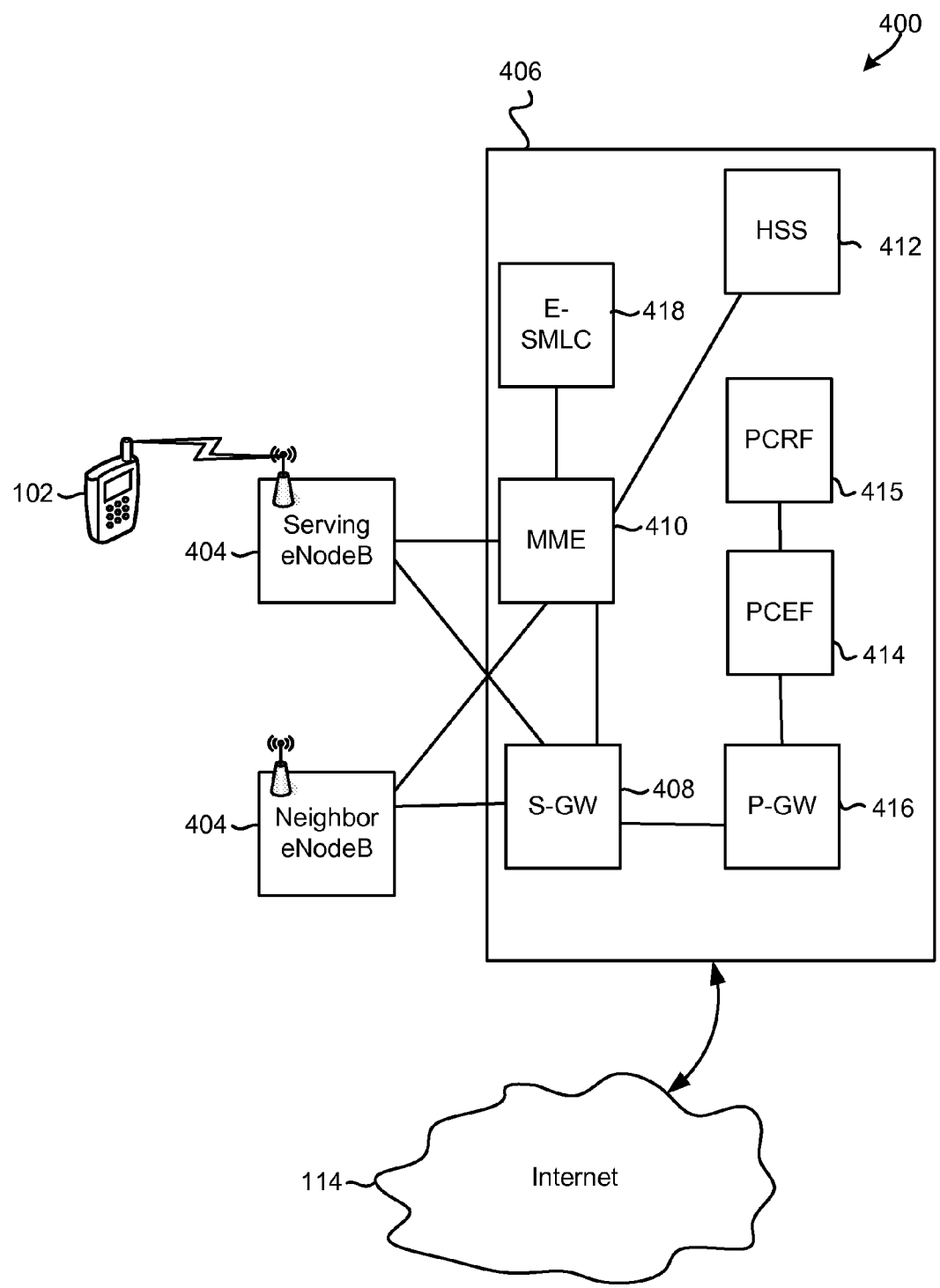
FIG. 4A is a communication system block diagram illustrating network components of an example LTE communication system suitable for use with various embodiments

FIG. 4A illustrates an example communication system within which the various embodiments may be implemented. Generally, the mobile device 102 may be configured to send and receive communication signals to and from a network 406, and ultimately the Internet 114, using a variety of communication systems/technologies (e.g., GPRS, UMTS, LTE, cdmaOne, CDMA2000™). In the example illustrated in FIG. 4, long term evolution (LTE) data transmitted from the wireless device 102 is received by a eNodeB (eNB) 404 and sent to a serving gateway (S-GW) 408 located within the core network 406. The mobile device 102 or serving gateway 408 may also send signaling (control plane) information (e.g., information pertaining to security, authentication, etc.) to a mobility management entity (MME) 410.

The MME 410 may request user and subscription information from a home subscriber server (HSS) 412, perform various administrative tasks (e.g., user authentication, enforcement of roaming restrictions, etc.), and send various user and control information to the S-GW 408. The S-GW 408 may receive and store the information sent by the MME 410 (e.g., parameters of the IP bearer service, network internal routing information, etc.), generate data packets, and forward the data packets to a packet data network gateway (P-GW) 416. The P-GW 416 may process and forward the packets to a policy and control enforcement function (PCEF) 414 which receives the packets and requests charging/control policies for the connection from a policy and charging rules function (PCRF) 415. The PCRF 415 provides the PCEF 414 with policy rules that it enforces to control the bandwidth, the quality of service (QoS), and the characteristics of the data and services being communicated between the network (e.g., Internet, service network, etc.) and the mobile device 102. In an embodiment, the PCEF 414 may be a part of, or perform operations typically associated with, the P-GW 416. Detailed information about policy and charging enforcement function operations may be found in "3rd Generation Partnership Project Technical Specification Group Services and System Aspects, Policy and Charging Control Architecture," TS 23.203, the entire contents of which are incorporated herein by reference.

In an embodiment, the network 406 may also include an Evolved Serving Mobile Location Center (E-SMLC) 418. Generally, the E-SMLC 418 collects and maintains tracking information about the mobile device 102. The E-SMLC 418 may be configured to provide location services via a lightweight presentation protocol (LLP), which supports the provision of application services on top of TCP/IP networks. The E-SMLC 418 may send or receive (e.g., via LPP) almanac and/or assistance data to and from the MME 410 and/or eNB 404. The E-SMLC 418 may also forward external or network initiated location service requests to the MME 410.

In addition, the mobile device 102 may receive information from the serving eNodeB 404 via System Information Blocks that includes the neighbor cells to scan that are on the same system using the same frequencies or different frequencies, Home eNB (HeNB), in addition to CDMA, GERAN and UTRA cells.

Figure 4B:
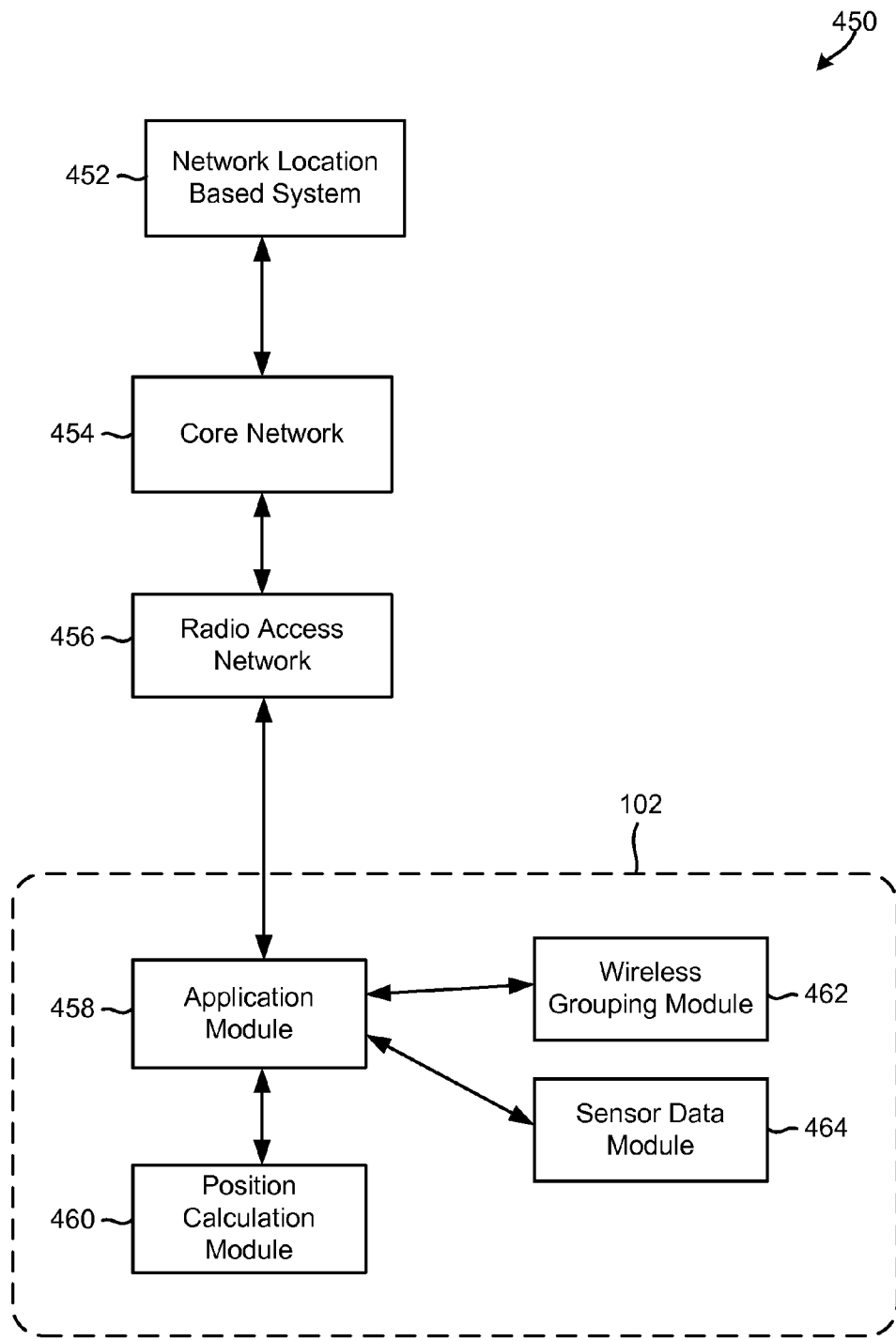
FIG. 4B is a block diagram illustrating logical components, communication links and information flows in an embodiment communication system.

FIG. 4B illustrates logical components, communication links, and information flows in an embodiment communication system 450 suitable for use in determining the location of the mobile device. The communication system 450 may include a network location based system 452, a core network 454, and a radio access network 456. The communication system 450 may also include an application module 458, a position calculation module 460, a wireless grouping module 462, and a sensor data module 464, any or all of which may be included in a mobile device 102. The application module 458 (e.g., client software) may request and receive location information from the network location based system 452 (e.g., through the core network 454 and the radio access network 456). Likewise, the network location based system 452 (or another client attached to, or within, the core network 454) may request and receive location information from the application module 458.

In various embodiments, the mobile device 102 may be configured to determine its geospatial location based on information collected from mobile device sensors (e.g. gyroscope, accelerometer, magnetometer, pressure sensor, etc.), information received from other mobile devices, and information received from network components in a communication system. In an embodiment, the collection and reporting of sensor information may be controlled/performed by the sensor data module 464. For example, the application module 458 may retrieve/receive sensor information from the sensor data module 464 and send the sensor information to the position calculation module 460 to compute the location of the mobile device locally for position updates and/or position augmentation. The application module 458 may also send the computed location information to the network location based system 452 and or other mobile devices.

As mentioned above, in various embodiments, the mobile device 102 may be configured to determine its geospatial location based on information collected from other mobile devices. In these embodiments, two or more mobile devices may be organized into groups. Each mobile device may also share its location information with the other mobile devices with which the mobile device is grouped. For example, mobile devices may be configured to share their current location and/or position information (e.g., latitude, longitude, altitude, velocity, etc.) and an estimate of a distance between themselves and a target mobile device with other mobile devices in their group.

In an embodiment, the grouping of mobile devices may be controlled by the wireless grouping module 462. For example, the application module 458 may retrieve wireless group information (e.g., information pertaining to the locations of other mobile devices) from the wireless grouping module 462, and send the group information to the position calculation module 460 to perform local calculations for position updates and/or position augmentation. In an embodiment, the position calculation module 460 may perform the local calculations based on both sensor information received from the sensor data module 464 and group information received from the wireless grouping module 462.

In an embodiment, the mobile device 102 may be configured to automatically share its location information with other mobile devices upon discovery of the other mobile devices. Mobile devices may augment their location information (e.g., position coordinates) with information received from other mobile devices within same geographic location, and in a controlled pseudo ad-hoc environment. Since the shared location information (e.g., latitude, longitude, altitude, velocity, etc.) involves a relatively small amount of data, in an embodiment the mobile devices may receive such information from a network server by in-band and or out-of-band signaling.

When implemented in a 3GPP-LTE network, the various embodiments may include an E-SMLC 418 component configured to send and receive location information (e.g., latitude, longitude, altitude, velocity, etc.) to and from the mobile devices, which may be achieved both on-net and off-net. The location information may be delivered in standard formats, such as those for cell-based or geographical co-ordinates, together with the estimated errors (uncertainty) of the location, position, altitude, and velocity of a mobile device and, if available, the positioning method (or the list of the methods) used to obtain the position estimate To aid in the determination of the locations of mobile devices, 3GPP-LTE networks have standardized several reference signals. Various embodiments may use these reference signals for timing based location and positioning solutions. Such reference signals may include the primary and secondary synchronization signals and the cell specific reference signals.

As mentioned above, two or more mobile devices may be organized into groups. Mobile devices within the same group may be part of the same network, or may be associated with different networks and/or network technologies. The mobile devices within the same group may also operate on different network operating systems (NOSs) and/or radio access networks (RANs).

Figure 5A:
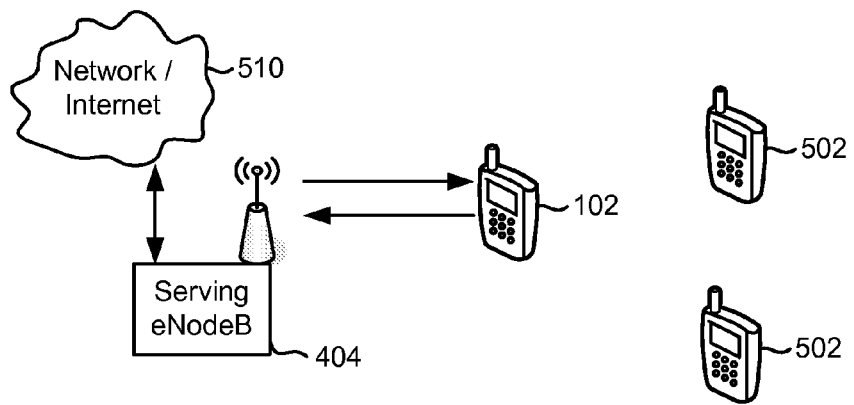
FIGS. 5A-5C are component block diagrams illustrating functional components, communication links, and information flows in an embodiment method of grouping mobile devices and sharing location information between grouped mobile devices.
Figure 5B:
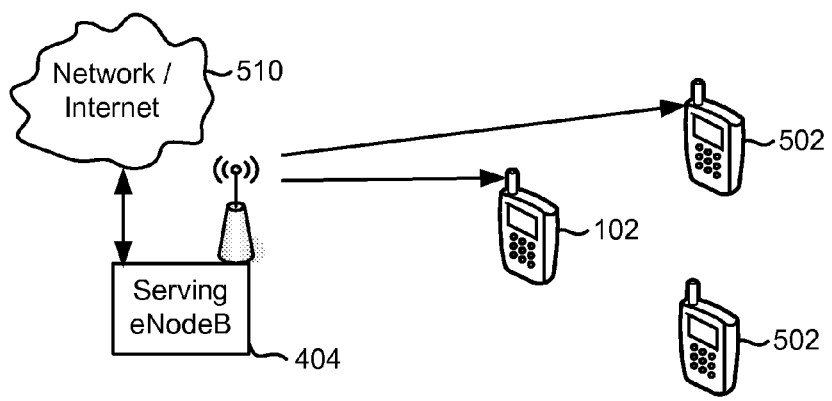
Figure 5C:
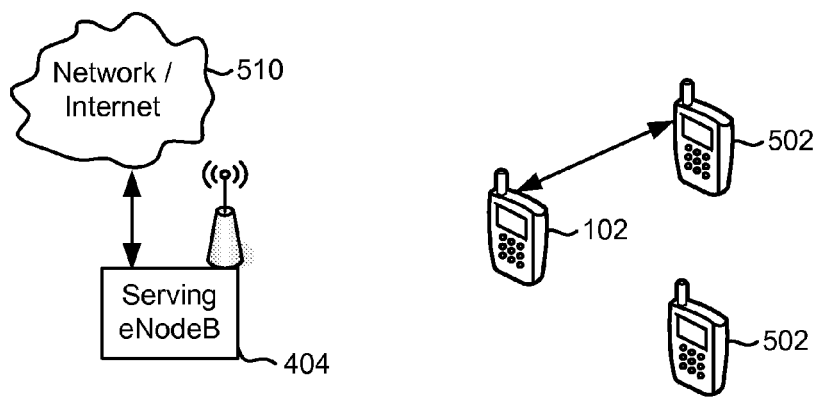

FIGS. 5A-5C illustrate functional components, communication links, and information flows in an embodiment method of grouping mobile devices and sharing location information between grouped mobile devices. With reference to FIG. 5A, after a mobile device 102 is powered on, the mobile device 102 may scan the airwaves for predefined and/or preferred radio frequency carriers and/or systems with which the mobile device 102 may connect to the network. If the mobile device 102 does not find an appropriate network with which it may connect (or loses its connection) the mobile device 102 may scan the airwaves for other radio access systems (e.g., mobile network, radio access point associated with a mobile device, etc.) to acquire (i.e., connect to) until a connection to a network/Internet 510 is established. These operations may also be performed in the event of a dropped call or power interruption.

The mobile device 102 may also begin acquiring GPS signals while scanning the airwaves for radio frequency carriers and/or systems. If the mobile device 102 cannot acquire GPS signals, a network component (not illustrated) may help determine the relative position of the mobile device 102 based on one or more of the location determination solutions discussed herein (e.g., based on the antenna used for the radio access point, the time delay, angle of arrival, etc.).

The mobile device 102 may acquire (i.e., connect to) an appropriate radio access system, radio frequency carrier and/or system via the mobile device's system acquisition system. In the examples illustrated in FIGS. 5A-5C, the mobile device 102 establishes a connection to a network 510 via an eNodeB 404. However, it should be understood that any or all of the communication technologies discussed above are contemplated and within the scope of the various embodiments.

After the mobile device 102 acquires the radio access system, the network 510 (i.e., a component in the network such as a server) will know the approximate location of the mobile device 102 (e.g., via one or more of the location determination solutions discussed above, such as proximity to base towers). In addition, the mobile device 102 may compute its current location (e.g., via GPS and/or the location determination solutions discussed above), store the computations in a memory of the mobile device, and report its current location to the network 510.

In addition to knowing the approximate location of the mobile device 102, the network 510 may also be informed of the locations of other mobile devices 502 and the proximity of the other mobile devices 502 to the recently acquired mobile device 102.

FIG. 5B illustrates that the network 510 may send instructions/commands to the mobile devices 102, 502 to cause the mobile devices 102, 502 to group with mobile devices 102, 502 and possibly others. In an embodiment, the network 510 may be configured to automatically group the mobile devices 102, 502 based on the proximity of the devices 102, 502 with respect to one another. In an embodiment, the network 510 may be configured to allow an incident command system (ICS) commander to group the devices. In an embodiment, the network 510 may be configured to allow the mobile devices to form groups based on their proximity to one another. FIG. 5C illustrates that the mobile device 102 may pair/group with another mobile device 502 and/or establish communication links so that the mobile devices 102, 502 may share real-time relative location information with each other. Two or more grouped/paired mobile devices 102 and 502 may identify their relative positions to each other by sending relative location information over the established communication links. The relative location information may include time-to-arrival, angle-of-arrival, and existing or self-aware location information. The mobile devices 102, 502 may be configured report sensor information to each other and/or the network 510. The sensor information may include x, y, z coordinate information and velocity information. The sensor information may be polled on a continuous basis, may be requested periodically, and/or made available on demand in response to network/system requests.

In an embodiment, a mobile device 102, 502 may be configured to report sensor information in response to determining that there is a high likelihood that there has been change in a location of the mobile device 102, 502 (e.g., in response to detecting motion). The mobile devices 102, 502 may also be configured collect and report sensor information to the network 510 in response to receiving an instruction/command from the network 510 (i.e., a component in the network such as a server or E-SLMC 418 illustrated in FIG. 4). The network 510 (i.e., a component in the network) may be configured receive the sensor and location information from the mobile devices 102, 502, and compute and store information about the distances (e.g., in time delay and angle of arrival with respect to the mobile devices 102, 502).

In an embodiment, the reporting of sensor information may be based on local parameter settings. For example, the mobile devices 102, 502 may be configured to transmit sensor information when any of the measured parameters (e.g., x, y, z and velocity information) meet or exceed a threshold value (e.g., exceed a rate-of-change, meet a timeout limit), which may be identified by local parameter settings stored in a memory of the mobile devices 102, 502. In an embodiment, the mobile devices 102, 502 may be configured to re-compute and/or update their location information in response to determining that the measured parameters (e.g., x, y, and z coordinates and velocity information) meet or exceed a threshold value.

In an embodiment, a mobile device 102 and/or the network 510 (i.e., a component in the network) may be configured to compare collected sensor information to computed latitude and longitude coordinates, relative altitude information, and other available information to determine if there is a discrepancy between the collected/measured values and the expected values. When it is determined that there exists a discrepancy between the expected and measured values, the mobile device 102 and/or network 510 may perform additional measurements to improve the location accuracy of the measurements/location information.

Figure 5D:
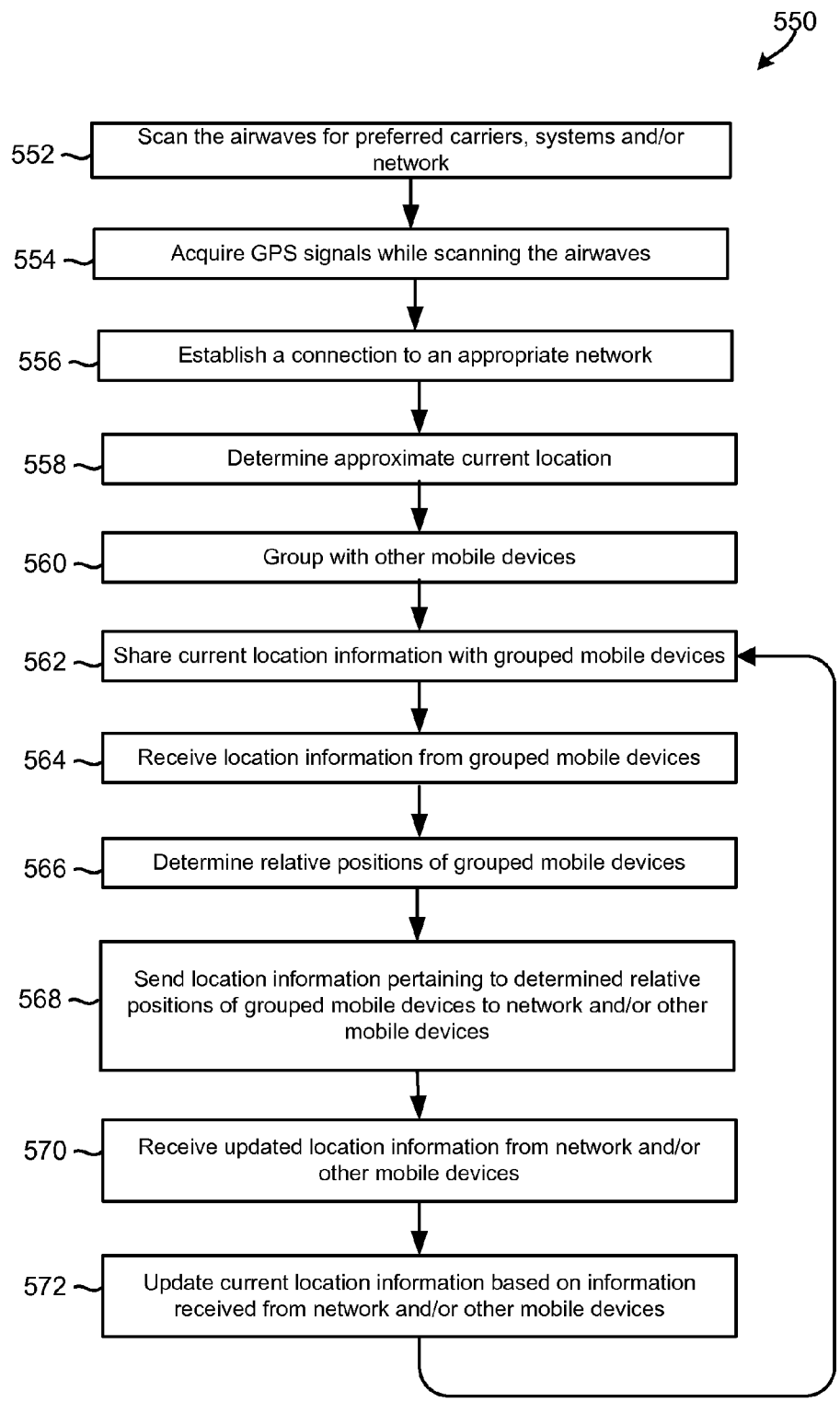
FIG. 5D is a process flow diagram illustrating an embodiment mobile device method for grouping mobile devices and sharing location information between grouped mobile devices and the network to compute enhanced location information.

FIG. 5D illustrates an embodiment mobile device method 550 for grouping mobile devices and sharing location information between grouped mobile devices and the network to compute enhanced location information. After a mobile device is powered on, in block 552, the mobile device may scan the airwaves for predefined and/or preferred radio frequency carriers and/or systems with which the mobile device may connect. In block 554, the mobile device may begin acquiring GPS signals while scanning the airwaves for radio frequency carriers and/or systems. If the mobile device cannot acquire GPS signals, the mobile device or a network component may, as part of block 554, determine the relative position of the mobile device based on one or more of the location determination solutions discussed herein. In block 556, the mobile device may acquire (i.e., connect to) an appropriate radio access system, radio frequency carrier, system and/or network.

In block 558, the mobile device may compute its current location (e.g., via GPS and/or the location determination solutions discussed above), store the computations in a memory, and report its current location to the network. In block 560, the mobile device may group with other mobile devices in response to receiving instructions/commands from a network component and/or in response to detecting that the other mobile devices are within a predefined proximity to the mobile device (i.e., within a threshold distance). In block 562, the mobile device may share its current location information, as well as information collected from sensors, with the grouped mobile devices. In block 564, the mobile device may receive location and/or sensor information from the grouped mobile devices. The sensor information may include x, y, z coordinate information, bearing, and velocity information.

In block 566, the mobile device may identify the relative positions of the other mobile devices, which may be achieve by evaluating the location and sensor information received from the other mobile devices and/or via any or all of the location determination solutions discussed herein. In block 568, the mobile device may send the relative location information, its current location information, and/or sensor information to a network component and/or the other mobile devices, which may receive the sensor and location information and compute updated location information (e.g., based on distance in time delay and angle of arrival, relative altitude information, etc.). In block 570, the mobile device may receive updated location information from the network component and/or the other grouped mobile devices. In block 572, the mobile device may update its current location calculation and/or information based on the information received from the network component and/or the other grouped mobile devices. The operations of blocks 562-572 may be repeated until the desired level of precision is achieved for the location information.

FIGS. 6A-6D illustrate functional components, communication links, and information flows in an embodiment method for computing location information in which the grouped/paired mobile devices 102, 502 are updated with their respective location information.

Figure 6A:
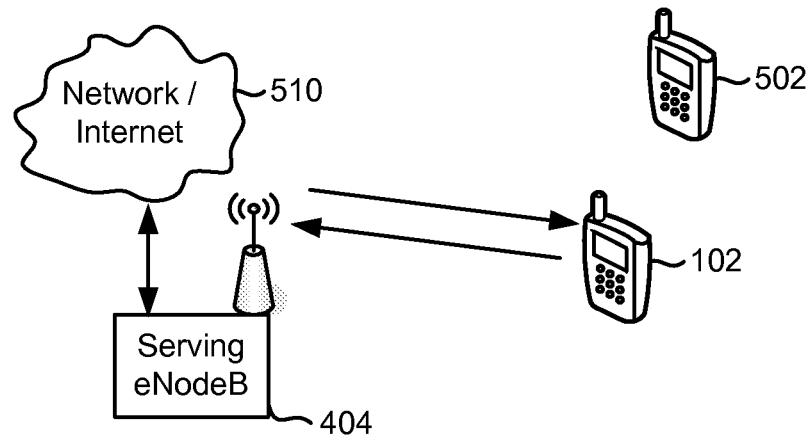
FIGS. 6A-6D are component block diagrams illustrating functional components, communication links, and information flows in an embodiment method for computing location information in which the grouped/paired mobile devices are updated with their respective location information.

FIG. 6A illustrates that the mobile device 102 may communicate with a serving eNodeB 404 to relay its location information to the network 510 and/or to receive location information from the network 510.

Figure 6B:
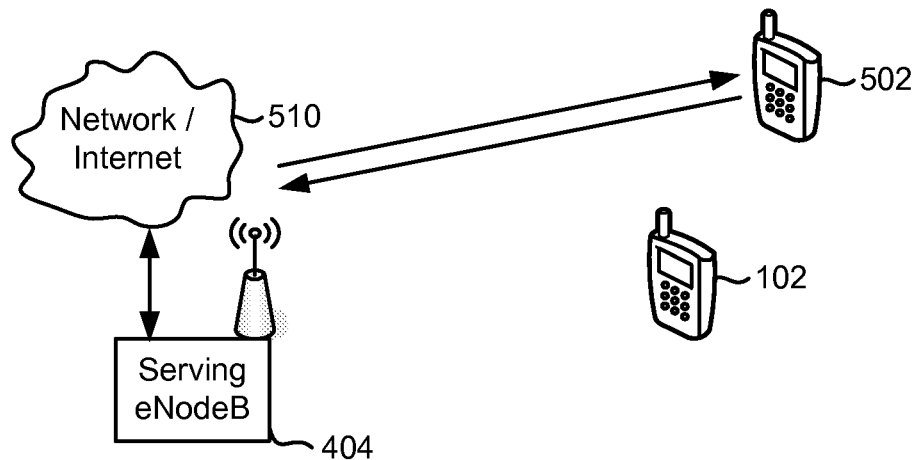

FIG. 6B illustrates that another mobile device 502 may also communicate with the serving eNodeB 404 to relay its location information to the network 510 and/or to receive location information from the network 510.

Figure 6C:
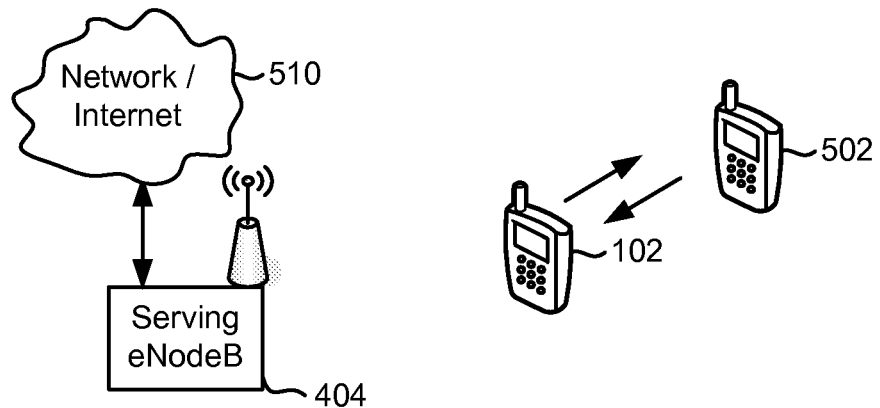

FIG. 6C illustrates that the grouped/paired mobile devices 102, 502 may communicate with each other to determine the distance between each other, which may be achieved by the mobile devices 102, 502 communicating various types of information, such as time-of-arrival, relative position with angle-of-arrival measurements, and other similar values, measurements, or computations. The mobile devices 102, 502 may then re-compute, refine, and/or update their current location calculations and/or location information based on information received from the other mobile devices 102, 502.

Figure 6D:
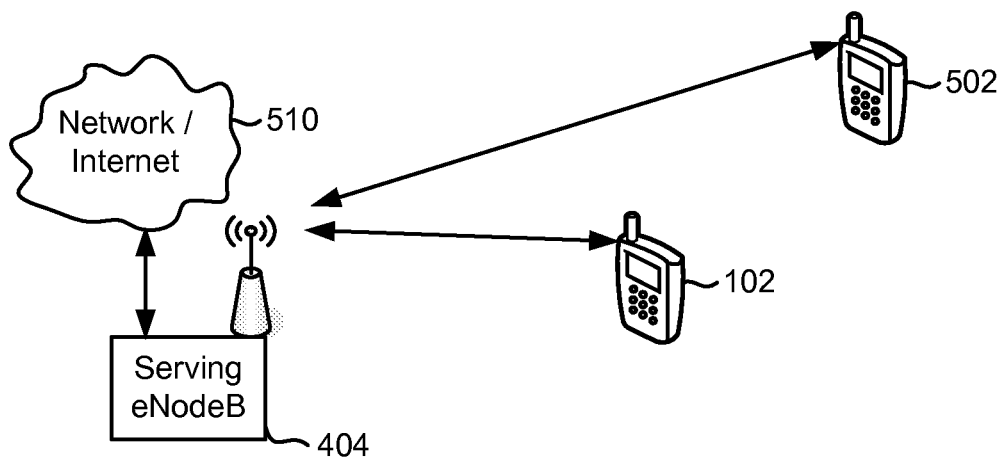

FIG. 6D illustrates that the grouped/paired mobile devices 102 and 502 may send their self-aware location information and/or relative location information to the network 510 (via the serving eNodeB 404), and receive updated location information from the network 510. For example, the mobile devices 102 and 502 may send their present location coordinates, distances between mobile device (e.g., distance to each other), altitude, and bearings (e.g., where mobile device 102 is with respect to mobile device 502) to the network 220. The network may compute updated location information based on the received information (e.g., coordinates, sensor information, proximity information, etc.), and send the updated location information to the mobile devices 102, 502. The mobile devices 102, 502 may then re-compute, refine, and/or update their current location calculations and/or location information based on information received from the network.

The operations discussed above with respect to FIGS. 6A-6D may be repeated so that the mobile devices 102, 502 recursively, continuously, and/or periodically re-compute, refine, and/or update their current location calculations and/or location information based on updated information received from the other mobile devices and/or the network 510 until the desired level of precision is achieved for the location information.

Figure 6E:
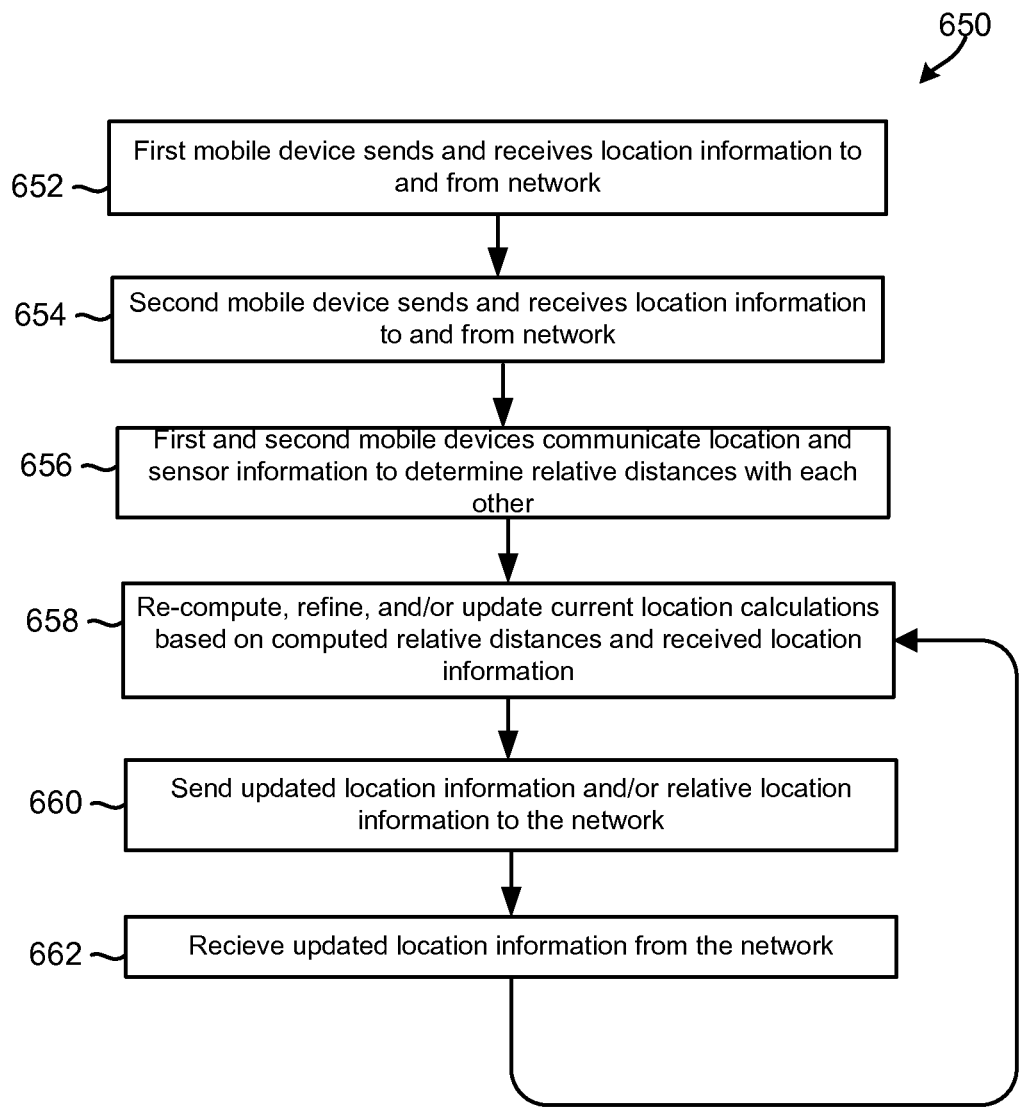
FIG. 6E is a process flow diagram illustrating an embodiment system method of determining the location of two or more grouped mobile devices.

FIG. 6E illustrates an embodiment system method 650 of determining the location of two or more grouped mobile devices. In block 652, a first mobile device may send and/or receive current location information to and from a network component. In block 654, a second mobile device may send and/or receive current location information to and from a network component. In block 656, the first and second mobile devices may communicate with each other to determine the relative distances between each other, which may be achieved by communicating various types of information, including time-of-arrival, relative position with angle-of-arrival measurements, velocity, altitude, etc.

In block 658, the first and/or second mobile devices may re-compute, refine, and/or update their current location calculations and/or location information based on information received from the other mobile devices and/or the network. In block 660, the first and/or second mobile devices may send their updated current location calculations and/or location information to the network component, which may receive the calculations/information and compute updated location information (e.g., based on distance in time delay and angle of arrival, relative altitude information, etc.). In block 662, the first and/or second mobile devices may receive updated location information from the network. The operations in blocks 658-662 may be repeated until the desired level of precision is achieved for the location information.

It should be understood that the methods and operations discussed above with reference to FIGS. 5A-5D and 6A-6F may also be performed such that they include more than two devices. For example, in an embodiment, the mobile devices may be grouped into units of four (4) such that each mobile device may triangulate its position relative to the other mobile devices in the same group.

In an embodiment, a mobile device 102 and/or a network component may store relative location information for all the mobile devices within each group, based on the type of grouping. For example, a network component may store relative location information for all the mobile devices grouped/paired by an incident command system (ICS) commander. Likewise, the network component may store relative location information for all the mobile devices grouped/paired based on their proximity to each another.

In an embodiment, the mobile device 102 may be configured to detect a low battery condition, and initiate operations to conserve battery. For example, a mobile device 102 may be configured to turn off its radio and/or terminate or reduce its participation in the group/pairing information exchange. As another example, a mobile device 102 may be flagged or identified as having a low battery condition, and the other grouped/paired mobiles devices may be informed of the low battery situation so that update intervals may be adjusted to reduce battery consumption.

Figure 6F:
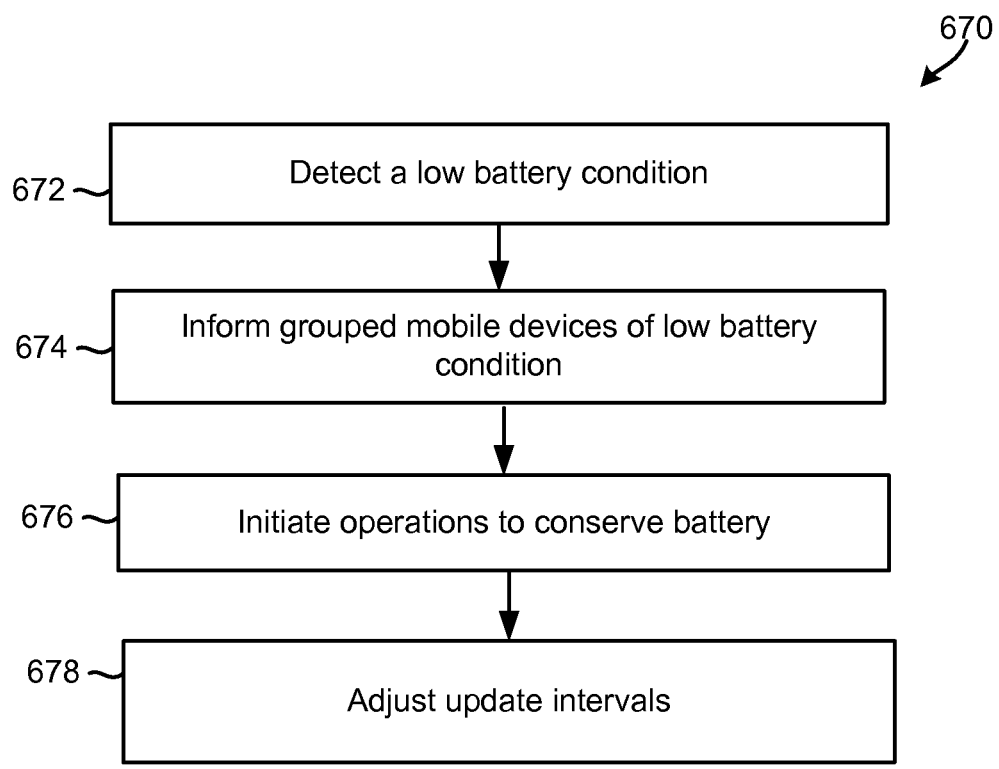
FIG. 6F is a process flow diagram illustrating an embodiment mobile device method of adjusting the update intervals in response to detecting a low battery condition.

FIG. 6F illustrates an embodiment method 670 of adjusting the update intervals in a mobile device in response to detecting a low battery condition. In block 672, the mobile device may detect/determine that the amount of power remaining in the mobile device battery is below a predetermined threshold. In block 674, the mobile device may transmit a signal or otherwise inform grouped mobile devices of the detected low battery condition. In block 676, may initiate operations to converse power, such as by turn off its radio and/or reducing its participation in exchanging information with grouped mobile devices. In block 678, the mobile device and/or the informed grouped mobile devices may adjust the update intervals with respect to the mobile device to reduce the load on the mobile device.

As discussed above, grouped mobile devices may share various types of information to improve the accuracy of the location determination calculations. For the information shared between grouped/paired mobile devices, a comparison may be made for the path, range, between the mobile devices using any or all of the information available to the mobile devices (e.g., location coordinates, sensor information, proximity information, etc.). If the two mobile devices report relative positional information that is within a user or network defined range tolerance as being acceptable this is information may be forwarded to the network. If the relative positional information is not within the user or network defined range tolerance, additional polling operations may be performed to improve the accuracy of the measurements or location information. The above-mentioned operations may be repeated until the desired level of accuracy is achieved. In an embodiment, the number of times the above-mentioned operations are repeated may determined based on a user-definable values which can be set by the network, user or algorithm used.

As mentioned above, a mobile device 102 may include two or more of the same type of sensor. In the embodiments in which the mobile device 102 includes more than one of the same type of sensor (e.g., includes two accelerometers), one of the sensors (e.g., one the two accelerometers) may be identified as a master sensor. The values measures by each sensor may be compared, and if the difference between the values falls within a tolerance range, the values measured by the master sensor may be used to compute the sensor parameters (e.g., x, y, z and velocity parameters). If the difference between the values falls outside a tolerance range, the mobile device may use information collected from other sensors (of the same or different types) to determine if the values measured by the master sensor are consistent with expected values. For example, the mobile device may use information collected from various other types of sensors to compute sensor parameters (e.g., x, y, z and velocity parameters), and compare the computed sensor parameters to similar sensor parameters computed based on the values measured on the master sensor to determine if the master sensor is functioning correctly. Values measured on the master sensor may also be compared to information stored in the network or other mobile devices to determine if the master sensor is functioning correctly. If it is determined that the master sensor is not functioning correctly, a secondary sensor may be designated as the master sensor. The previous master sensor may be demoted to standby status (i.e., for use if the primary sensor has a failure) and not used for immediate positional calculations.

As mobile devices move into an area, the mobile devices may be asked to group/pair with more devices. The number devices that a mobile device can group/pair with may be restricted by user configuration, through the system, and/or user intervention so as to conserve battery and computational efforts (e.g., when the mobile device detects a low battery condition).

In an embodiment, proximity grouping may be used in the x, y and z coordinates/fields and/or for velocity and acceleration information.

In the event that a mobile device is unable to group with another mobile device with which it is instructed to group/pair with (e.g., due to a RF path problems), the mobile device may group with yet another mobile device in an ad-hoc fashion. If no mobile device is pairable with the mobile device, it may rely on its own geographic and/or and sensor information to report to the network.

When a mobile device 102 is undetected as being within a given proximity of a grouping radius, other mobile devices in the same group as the mobile device 102 may be informed of the decision to degroup/depair them from the mobile device 102. In an embodiment, the system may be configured so that an approval from the incident commander or user is required before the mobile is degrouped/depaired. In an embodiment, this may be achieved may transmitting a signal to a mobile device of the incident commander or user requesting approval, to which the incident commander or user may send a reply approving or disapproving of the request to degroup/depair. In an embodiment, the degrouping/depairing process may be transparent to the mobile device users.

In the event that a mobile device is unable to communicate with the network, the mobile device may send telemetry information pertaining to location services (and other telemetry information) to a grouped mobile device for relaying to the network.

In an embodiment, polling for information may be performed once the network has lost communication with the mobile device. Mobile devices that and known to be grouped to the mobile device may be instructed to communicate with the disconnected mobile even when it is trying to reacquire the network. A logical sequence based on proximity, signal quality to the network, and/or battery strength may be used to determine which mobile device will be used as a relay for communicating with the network.

The relayed telemetry information may include more than just positional information. For example, the telemetry information may also include bio sensor and user bio information reporting on the environment and user conditions, including heart rate and temperature, CO, O2 and other sensor information.

In an embodiment, the network may continuously measure/monitor the connected mobile devices. Knowing their location and relative location to each of the other mobile devices enables the network to continuously measure the uplink and downlink communication paths. If a communication path degradation occurs and begins to fall within a defined system quality range (which may be user defined), a mobile device may be instructed to either handover to another radio access node for the same network and/or network technology, or be instructed to initiate to perform relay operations to relay communications though a defined mobile device as a secondary signal path.

In the event that a communication link is lost with the network the mobile device may attempt to acquire itself on another network. While the acquisition process is underway, a mobile device may act as a mesh device. Other mobile devices in the proximity group may also connect as a mesh network.

In an embodiment, the mobile devices may utilize dead reckoning techniques to compute location information. Mobile devices may store the information for use in calculating more accurate location information, and may eventually relay to another mobile device which has network access or until one of the mobile devices or both devices have access to the initial network or another network and granted access to whether it is public or a private network.

Figure 7:
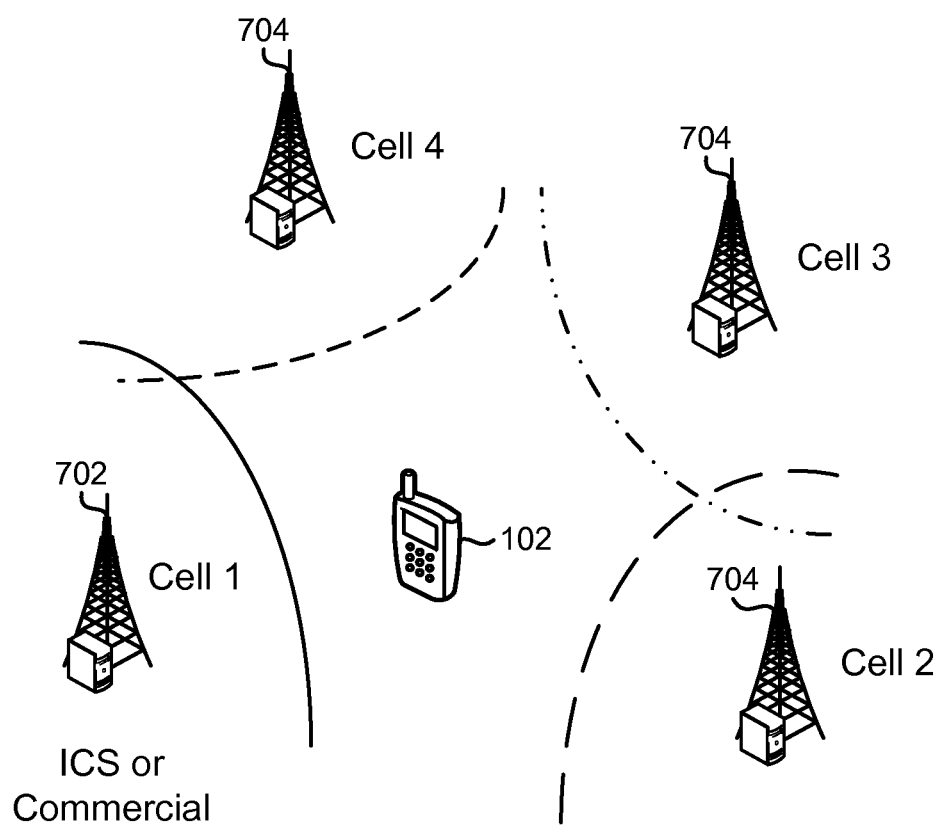
FIG. 7 is a component block diagram illustrating functional components, communication links, and information flows in embodiment method of periodically scan for cells.

FIG. 7 illustrates normal operating conditions in which a mobile device 102 will periodically scan for other cells 704, including its serving cell 903. If the radio access points are part of the network then the mobile device will report the identity and signaling information required by the existing network to determine (e.g., via triangulating and/or trilateration) the mobile device's location based on a network approach. If the mobile device detects a radio access point is not part of its preferred cell selection process, it may attempt to read the coordinates and positional information from the access point that is broadcast.

Once synched with the access point the mobile device may determine the timing difference and other requisite information to help determine its relative location and distance from the access point. This information may be related to the location system used by the mobile device to help refine its current location calculations.

Additionally the mobile device may be configured to compare each cell read to its own coordinate and using bearing and time difference for all the cells it reads. The mobile device may then triangulate on its own position.

During a 911 call a software application on the distressed mobile device may be executed. The software application may access an active neighbor list, read the overhead of each cell, and use that information to triangulate on the mobile device's own positions. The mobile device may also read the time offset for each of the cells.

In this case the system begins to try and locate the distressed mobiles position with more precision an accuracy to assist First Responders with triangulating on the distressed mobiles position and sending the information to the incident commander and/or public service answering point (PSAP) with a relative distance to target indication that is updated on pre-defined intervals. If the mobile device has lost contact with the 911 center, PSAP then the last location is continuously display and any velocity information is also relayed to assist the first responders.

In an emergency, the mobile device 102 may be configured to send its location information to the network. The mobile device 102 may be configured to automatically send its location information in response to detecting the emergency, or may provide the user with an option to send the location information. In an embodiment, the mobile device 102 may be configured to send its location information in response to a network initiated command.

Each mobile device may become an access point (AP). The decision to be the access point may be periodically updated while still in communication with the network, or when no network is found. Upon powering up, each mobile device may act as a client, and on a pseudo random time interval, the mobile devices may become an access point and then a client.

The location based methodology may be the same for a frequency-division duplexing (FDD) and a time-division duplexing (TDD) system. However in the event that the communication link between the mobile device and the network is lost, the mobile device may be configured to relay its telemetry information through another mobile device having network access.

In an embodiment, all information sent via wireless communication links may be digital. In an embodiment, the information may be encrypted to a requisite advanced encryption standard (AES) standards level or the appropriate encryption level needed for the requisite communication system and access method used.

Generally, the location based systems (LBS) may utilize reactive or proactive based methods. In a reactive location based system, the mobile devices may synchronously interact with each other on a time basis or some other predetermined update method. In a proactive location based system, the mobile devices may update their location information based on a set of predetermined event conditions using an algorithm. The various embodiments may include both reactive and proactive aspects, taking the best of both approaches to enhance location accuracy and precision.

Various embodiments may include location determination solutions that utilize horizontal data (i.e., a set of reference points on the Earth's surface against which position measurements are made) and/or vertical data. Horizontal data define the origin and orientation of the coordinate system and are prerequisites for referring a position relative to the Earth's surface. Vertical data are based on geoids, which primarily serves as a basis to determine the height of a position relative to means sea level for which the geoids act as a benchmark for origin and orientation. Various embodiments may utilize horizontal and vertical data to provide/generate enhanced three dimensional location information. The horizontal and vertical data can be global, national, local or custom depending on the locality and positioning reference system utilized.

Traditionally global data are used for position location as compared to a local datum. Global data are used for initial position fixing if possible and are based on GPS coordinates. Local data are based on a particular position on the surface of the earth, which allows for a non GPS based location based services to take place. The various embodiments may use global data, local data, or both. In an embodiment, GPS may be used to help identify the initial positional fix, and may be augmented by dead reckoning and a hybrid trilateration solution that utilizes both network and terminal based positioning. In this embodiment, both local and global data may be used. If GPS determined position information is unavailable then the initial position may be sent to the same position as that of the reporting mobile or a distance that is estimated using received signal strength indication ("RSSI") and/or time of flight such that 0.5 of the estimated distance is applied to the horizontal component and vertical component of the reporting mobile device and the altitude, which may also be reported by the additional mobile devices.

Generally, a hybrid lateration and trilateration solution includes a mobile device performing a measurement and sending it to the network, and a network component performing the location determination calculations. The various embodiments include a hybrid lateration and trilateration solution in which the mobile device performs the location determination calculations, with and without the support of the network components.

Various embodiments may include sensor fusion operations in which a collaborative approach is used so that the sensors do not act as individual sensors, but as a collective team. As discussed above, the mobile device may include various sensors (e.g., accelerometer, gyros, magnetic compass, altimeters, odometers, etc.) capable of generating heading, orientation, distance traveled, and velocity as part of the sensor information collected on the mobile device. In various embodiments, information collected from any or all the internal sensors may be used for improving location or positioning accuracy and/or confidence improvements. Various embodiments may compute location information based on information from multiple sensors, with or without the aid of radio frequency propagation information.

The sensor fusion operations may include the sharing of telemetry including sensor data indicating relative movement of the individual mobile device, which enables temporal readings to assist in the location estimate, either with external assistance or dead reckoning.

Figure 8:
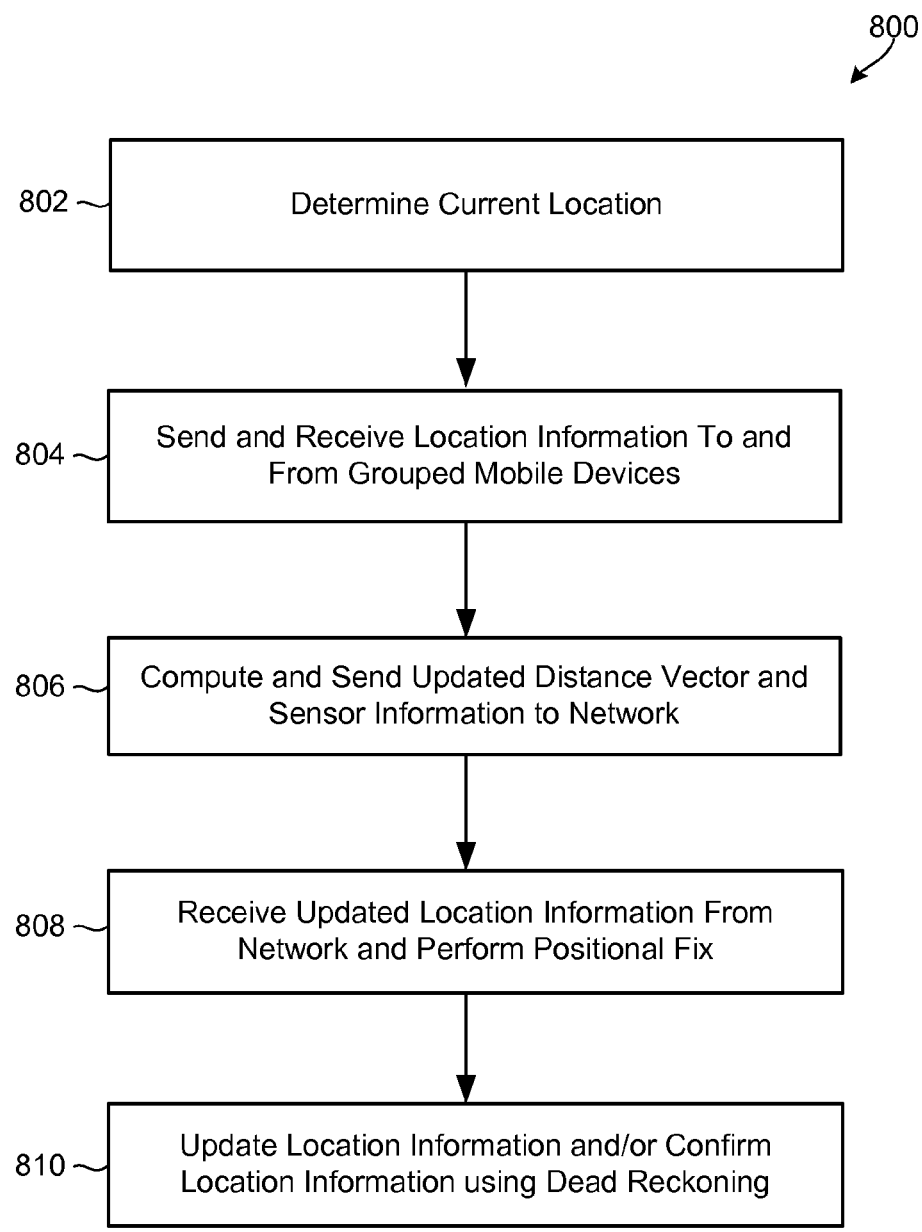
FIG. 8 is a process flow diagram illustrating an embodiment mobile device method for determining the location of a mobile device in a wireless network.

FIG. 8 illustrates an embodiment mobile device method 800 for determining the location of a mobile device in a wireless network. In block 802, a mobile device may determine its current location using any of the above mentioned location determination solutions to produce a final location estimate. In block 804, the mobile device may share its location information (i.e., the final location estimate) with other grouped mobile devices and/or receive location information from other grouped mobile devices. In block 806, the mobile device may compute and send a final location estimate, updated distance vector and sensor information to a network component for improved positional fix. In block 808, the mobile device may receive updated location information from the network component, and perform its own positional fix based on mobile data information received from the network. In block 810, the mobile device may update its location information and/or confirm its location information using dead reckoning to enhance positional accuracy.

Dead reckoning may provide the needed positional corrections as a local datum method for positioning when GPS or other network related positioning solutions are not available. Additionally dead reckoning may enhance the location position accuracy and precision calculations by providing and additional horizontal and vertical datum comparisons.

With dead reckoning, the current position may be deduced (or extrapolated) from the last known position. The dead reckoning accuracy requires a known starting point which either can be provided by the network, GPS, near field communication link, RF beacon, a predetermined zero position, or via another mobile device. For example, if GPS initial position information is available then the initial position may be set to zero or a distance that is estimated using RSSI or time of flight between another mobile device such that 0.5 of the estimated distance between the mobile device and a measurement location (e.g., another mobile device) is applied to the horizontal component and vertical component of the reporting mobile device and the altitude, which may be reported by the additional mobile device A dead reckoning system may be dependent upon the accuracy of measured distance and heading, and the accuracy of the known origin. However the problem with relying on dead reckoning alone to assist in positional improvement is error accumulation caused by sensor drift (i.e., differences or errors in values computed/collected from one or more sensors). In particular, magnetic, accelerometers and gyroscopes are susceptible to sensor drift. The error accumulation for any of the sensors may increase over undulating terrain, as compared to flat terrain. Bias error and step size error are leading contributors to dead reckoning errors.

Various embodiments may tightly couple the mobile device sensors and continuously recalibrate the sensors to reduce any drift problems caused by unaided dead reckoning Additionally, as part of the tightly coupling the sensors, any bias drift associated with the sensors (e.g., a gyroscope) may be address by utilizing a kalman filter to reduce the errors from the primary and/or secondary sensors (e.g., gyroscopes).

In various embodiments, the mobile device may be configured to include velocity computations as part of the location determination computations to account for position changes that occur. When a GPS signal is available, the step size (via velocity computation) and compass bias errors may be estimated by an Enhanced Kalman Filter (EKF). Additionally if GPS is available, the compass may also be able to identify slow motion changes due to changes in magnetic inclination. The compass may be relied upon for motion computations in addition to that of accelerometers and gyroscopes, with and without the availability of GPS.

Dead reckoning accuracy degrades with time, requiring regular position updates or positional corrections. Therefore, the mobile device may be configured to not only use its own internal sensors to compute the location/positional information, but may also communicate with other mobile devices to leverage their location/positional information to enhance its own location/positional information. In essence, the mobile devices may act as RF base stations, proving the lateration capability to improve the positional accuracy of other mobile devices.

In an embodiment, a mobile device may be configured to poll one or more other mobile devices to gain a better positional fix on its location.

Mobile devices may be grouped together, either through assignment by the network or through the mobile device acquiring/detecting/connecting to other mobile devices (which may or may not be in the same network) as part of a discovery method for sharing location information.

Location information may be shared via the use of a near field communications system (e.g., Bluetooth®, ultrawideband, peanut radios, etc.), infrared, ultrasonic, and other similar technologies, such as via the use of WiFi. The wireless communications may also be ad hoc or infrastructure based, or based on a TDD system, such as LTE, SD-CDMA, TD-CDMA, or any other TDD methods.

In an embodiment, the mobile device may be configured to initiate the sharing of location/position information in response to receiving a network-driven grouping request from a network component.

In an embodiment, when the mobile device has lost contact with the network, it may attempt to find a suitable mobile device to help in its location determination computations, and for possible connection to the network (e.g., via a relay).

In an embodiment, the mobile device may be configured to send a request for location information to another mobile device. The request may be sent after the authentication process between mobile devices, and may include a time stamp which may be sub-seconds in size (milliseconds). Another mobile device may respond with a message that also has its time stamp and when it received the time stamp from the initiating mobile device.

Several messages (e.g., three messages) may be exchanged quickly between the mobile devices to establish time synchronization and share location/positional information that includes horizontal, vertical, and altitude coordinates (e.g. x, y, and z coordinates), a velocity, and acceleration component in each message. The time differences along with the x, y, and z coordinates may be compared with possible pulses or pings to establish an estimated distance vector between the devices.

When the distance vector and the x, y, z coordinates of two mobile devices are known, a point-to-point fix may be established. This process may be repeated for all the mobile devices in a group that has been assigned or created by the mobile device itself. Having multiple distance vectors from other points to the mobile will enhance the positioning accuracy.

A mobile device may be configured to report back to the network location server the distance vectors it has found between different mobiles. The other mobile devices also involved with the positioning enhancement may also report their distance vectors to the network to have their overall position accuracy improved as well.

The positional accuracy is meant to be done in incremental steps and the process will continue until no more positional improvements will be achievable. The positional accuracy improvement threshold may be operator defined, and may be stored in a mobile device memory.

When collecting the distance vectors and other positional information, if the error in position is greater than x % for a lower positional confidence level then no update may be required. As the mobile device receives other sensor data and more than a pre-described distance in any direction or a combined distance vector than the positional update process begins again. However if the x % of positional confidence level is less than desired additional positional, updates may be made with the mobile devices grouped together in an interactive process to improve the confidence level of the positional information.

It is important to note that typical positional location methods that are used currently by the network are not necessarily replaced with above-described positional lateration. Instead, the hybrid lateration method may be used in various embodiments to augment the positioning accuracy and confidence for network based position request due to boundary changes or paging requests or other position location triggered events.

Figure 9A:
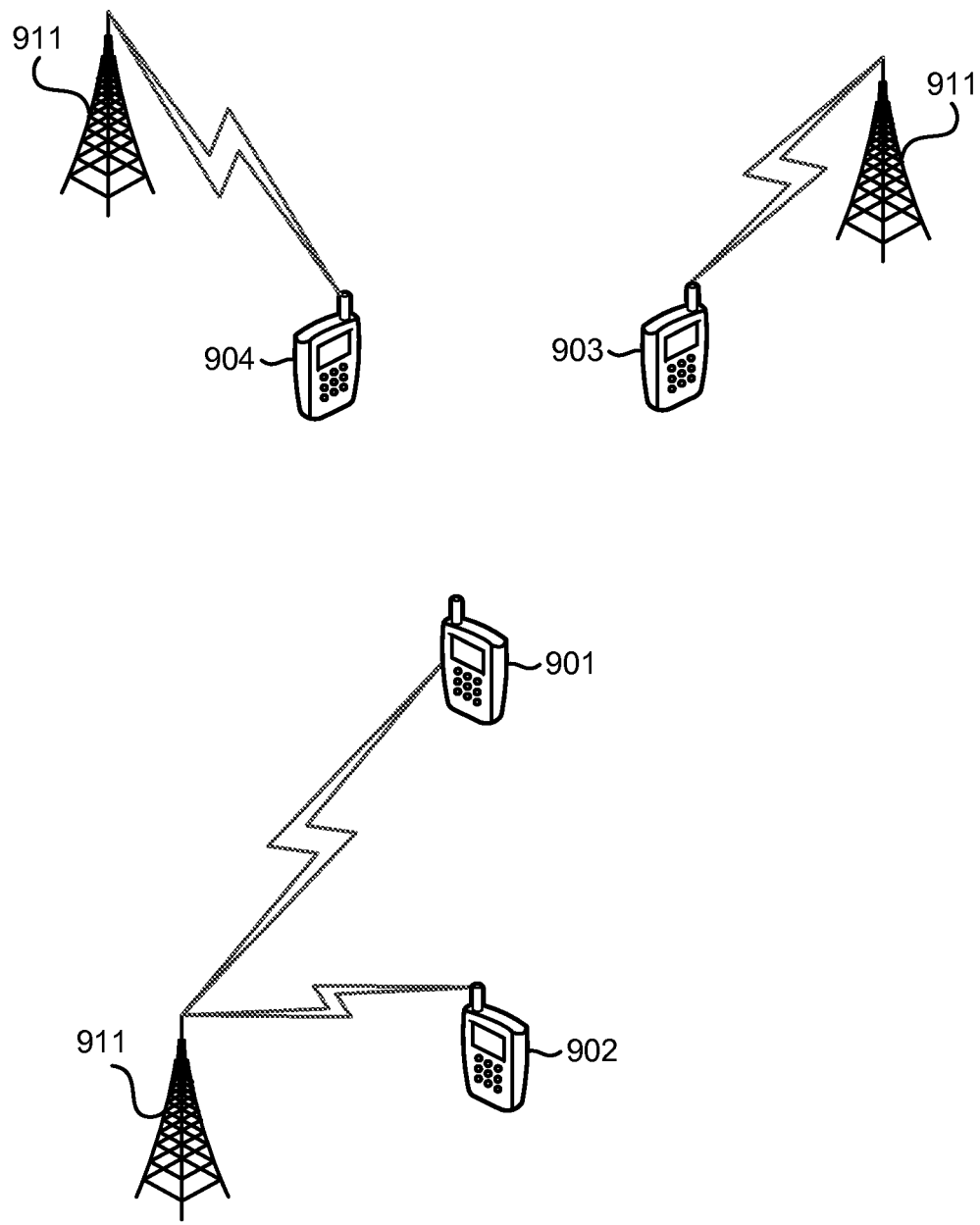
FIGS. 9A-9E are component block diagrams illustrating various logical and functional components, information flows and data suitable for use in various embodiments.

FIGS. 9A-9E illustrate various logical components, information flows and data suitable for use in various embodiments. FIG. 9A illustrates that mobile devices 901, 902, 903, and 904 are communicating with the wireless network via multiple cell sites/radio access points/eNodeBs 911. The mobile devices 901, 902, 903, and 904 may compute a relative fix on their initial location using any of the location determination solutions discussed above. A first mobile device 901 may be instructed to find and communicate with the other mobile devices 902, 903 and 904, and/or any or all of mobile devices 902, 903 and 904 may be instructed to communicate with the first mobile device 901. The mobile devices 901, 902, 903, and 904 may be grouped together (e.g., via one of the grouping methods discussed above). The network may also designate one of the mobile devices 901 (e.g., a mobile device having a high position confidence) to be used as the reference or beacon for the other mobile devices 902, 903, and 904 within the group of mobile devices 901, 902, 903, and 904.

Figure 9B:
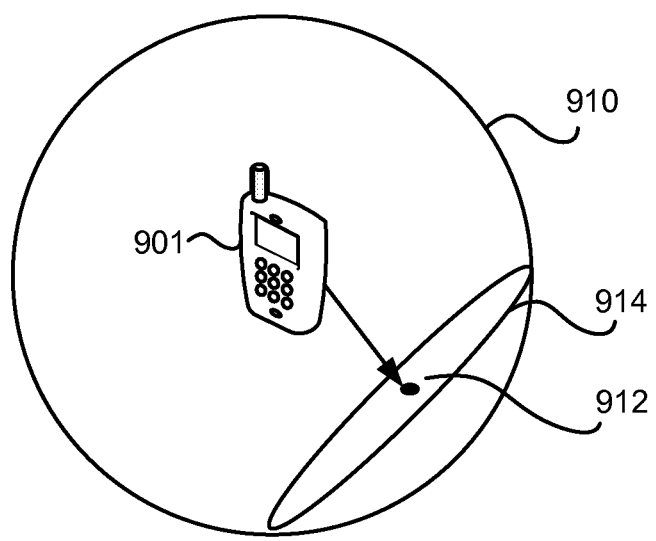

FIG. 9B illustrates that a combination of circular and hyperbolic trilateration operations may be performed as part of an embodiment location determination solution. For example, if any of the coordinate data provided by the sensors and/or mobile devices is in latitude and longitudinal coordinates, it may be converted to Cartesian coordinates to facilitate a hybrid lateration calculation. In the example illustrated in FIG. 9B, the mobile devices 901 has been designated as reference mobile device, reference number 912 identifies the position to be determined/computed (i.e., with a high level of accuracy) with respect to mobile device 901, reference number 910 identifies a three dimensional sphere that encompass the mobile device 901, and reference number 914 identifies an area of the three dimensional sphere (with x, y and z coordinates) within which the device exists.

Figure 9C:
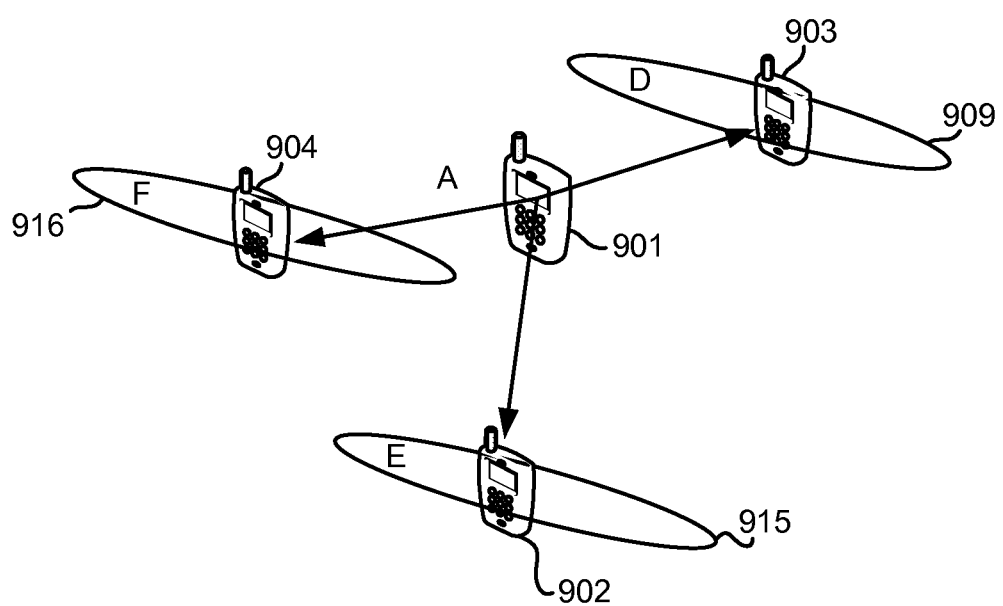
Figure 9D:
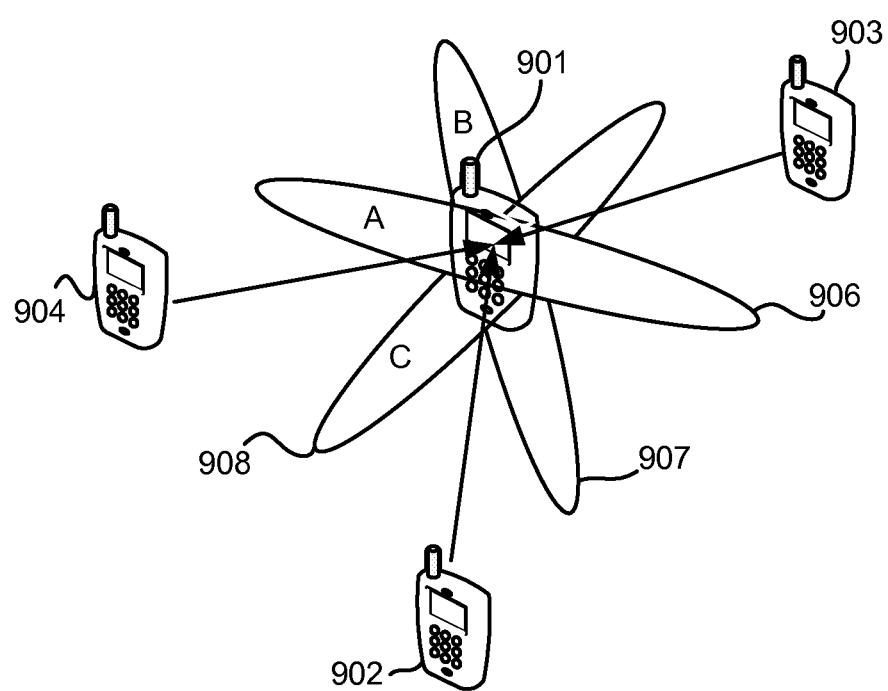

FIG. 9C-9D illustrate that distance vectors may be computed between the mobile devices 901, 902, 903, and 904 as part of an embodiment location determination solution. In FIG. 9C mobile 901 using the hybrid trilateration method determines is relative position with respect to mobile devices 902, 903 and 904 respectively, Additionally, reference numbers 915, 909, and 916 identify the relative areas of mobile devices 902, 903, and 904, respectively. As part of the hybrid trilateration operations of the embodiment location determination solution, mobile devices 902, 903, and 904 may locate mobile device 901, and the mobile device 901 may compute a distance vector between itself and mobile devices 902, 903 and or 904. The mobile device 901 may initiate communications with mobile device 902 (although mobile device 902 could initiate the communication) and exchange time stamps, positional information, sensor data. The same process may occur with respect to mobile devices 904 and 903, in which positional and sensor information is exchanged.

As illustrated in FIG. 9D, the mobile devices 902, 903, and 904 may establish a distance vector between themselves and mobile device 901. The same process may occur with respect to mobile devices 902, 903 and/or 904, in which positional and sensor information is exchanged. Where mobile device 902 undergoes the same process as that done with mobile device 901 as part of the hybrid trilateration process, mobile device 901 may use mobiles 902,903, 904 to enhance it positional information and mobile device 902 may use mobiles 901,903 and 904 to enhance its positional information, and so forth for all the mobile devices that are grouped together.

The three circles or ellipses 909, 915 and 916 illustrated in FIG. 9C and the three circles or ellipses 906, 907 and 908 illustrated in FIG. 9D do not intersect at a given point, but span an area of a particular size depending on the range involved.

Figure 9E:
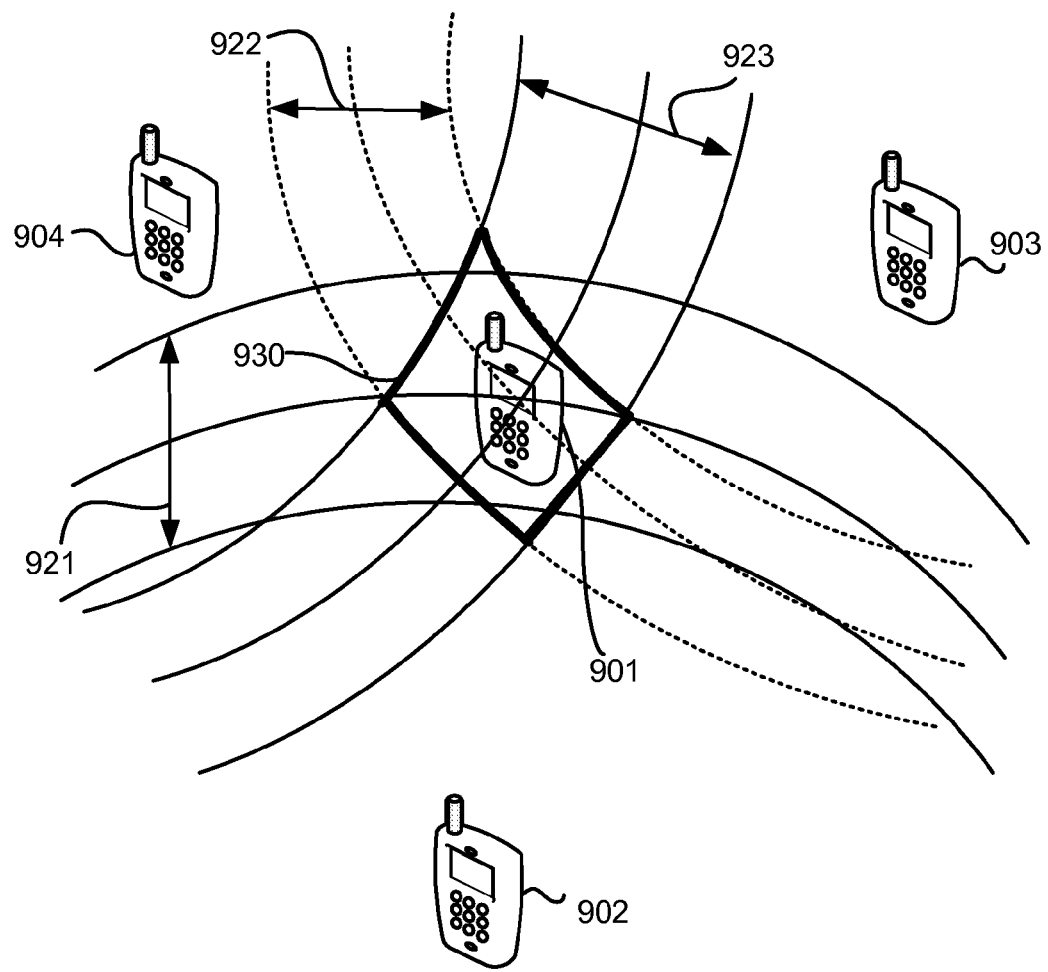

FIG. 9E illustrates an embodiment hybrid trilateration method in which the position of mobile device 901 is validated or improved upon. As part of the hybrid lateration method, separate calculation operations may be required for each set of x, y and z coordinates, in addition to accounting for velocity and acceleration. However, the ability to have three mobile devices 902, 903, and 904 locate mobile device 901 may present an error window (or an error area) for each coordinate plane represented by reference number 930. The error window/area may be a combination of range errors from the mobile devices 902, 903, and 904. Contributing to the error window/area is the hybrid range errors illustrated by reference numbers 921, 922 and 923, where: reference number 921 is the hybrid range error associated with mobile device 902; reference number 922 is the hybrid range error associated with mobile device 903; and reference number 923 is the hybrid range error associated with mobile device 904. Additionally this process can be done with less or more mobile devices than used in the above example.

For each axis (x, y, or z), a similar process occurs where the error area 930 is a combination of determining the range between the other mobile devices and mobile device 901. The hyperbolic lateration is a typical calculation method used in location based systems and is based on the principal that the range between two locations is the same. However the range determined for the points may not be constant since both can be moving toward, away or together at a similar velocity and trajectory.

With the hybrid lateration method proposed a corrective distance vector $\Delta x, \Delta y, \Delta z$ is used that can be used to apply to the estimated position.

The three circles or ellipses 909, 915 and 916 illustrated in FIG. 9C and the three circles or ellipses 906, 907 and 908 illustrated in FIG. 9D do not intersect at a given point, but span an area of a particular size depending on the range involved. Therefore range is "r" and is denoted by the subscript representing the distance vector involved. Thus:

$$r = p_i + \text{error}$$

The pseudo range $p_i$ deviated from the actual range in any axis due to the inaccuracy in synchronization or propagation in a multipath environment or due to sensor induced errors. Where the distance vector accounting for change in direction is:

$$r_i = \sqrt{(X_i - x)^2 + (Y_i - y)^2 + (Z_i - z)^2}$$

Three range calculations are then averaged to determine the distance vector that is used. If the previous range calculation $r_j$ as compared to that of the current calculation has an error in excess of a user defined % or variant then the new measurement is disregarded. Included with the distance vector validation may be the fusion sensor information where expected position verse calculated may be included for the confidence interval.

$$\text{Range difference} = d_{ij} = r_i - r_j$$

An iterative process may be used for position improvement, which may include the use of a least squares calculation fit to approximate the position solution in a step wise basis. The process may continue until the range difference measured does not produce any noticeable accuracy improvement, which may be user-defined, either at the mobile device or network or both.

The multi-lateration calculations may include estimating a location of a mobile device based upon estimated distances to three or more measurement locations (i.e., locations of three other mobile devices or wireless transceivers). In these calculations, the estimated distance from a measurement location (location of another mobile device) to the mobile device may be derived from the measured signal strength. Since signal strength roughly decreases as the inverse square of the separation distance, and the transmission power of the mobile device can be presumed, the distance $d_i$ can be simply calculated as:

$$d_i = \sqrt{(S_0/S_i)}$$

where:
a. $d_i$ is the estimated separation distance between a measurement location and the mobile device;
b. $S_i$ is the measured signal strength; and
c. $S_0$ is the strength of the signal transmitted by the other mobile device).

Alternatively, the signal strength readings may be translated into distances using a path loss model, such as the following:

$$RSSI_i = a - cb \log_{10}(d_i)$$

where:
d. a is the signal strength at $d_i = 1$ meter;
e. b is the path loss exponent; and
f. c is the pathloss slope with 20 being used for free space.

The lateration operations may include performing a least squares computation, which may accomplished by a processor calculating the following formula:

$$\min_{(x,y)} \Sigma (d_i - \|MS_i - (x,y)\|)^2$$

where:
g. $d_i$ is the distance calculated based on a measured signal strength value;
h. $MS_i$ corresponds to the known location/position of the mobile device; and
i. the minimization value of (x, y) is the estimated position of other mobile devices.

In various embodiments, the velocity and acceleration of the mobile device with respect to the three or more reference locations (i.e., locations of three other mobile devices or wireless transceivers) may be determined along with the estimated distance from each reference location to the mobile device. The estimated distances to three or more measurement locations (i.e., locations of three other mobile devices or wireless transceivers), velocities, and acceleration calculations may have their components separated into a horizontal component set, a vertical component set, and an altitude component set respectively. As will be discussed in greater detail below, each of the component sets may contain the distance component, velocity component, and acceleration component for each of the reference locations. For example, an "x" component set may contain the distance x components, velocity x components, and acceleration x components associated with all reference locations. Some embodiments may include executing a kalman filtering procedure on the component sets individually to produce an estimated position of the mobile device.

Figure 10:
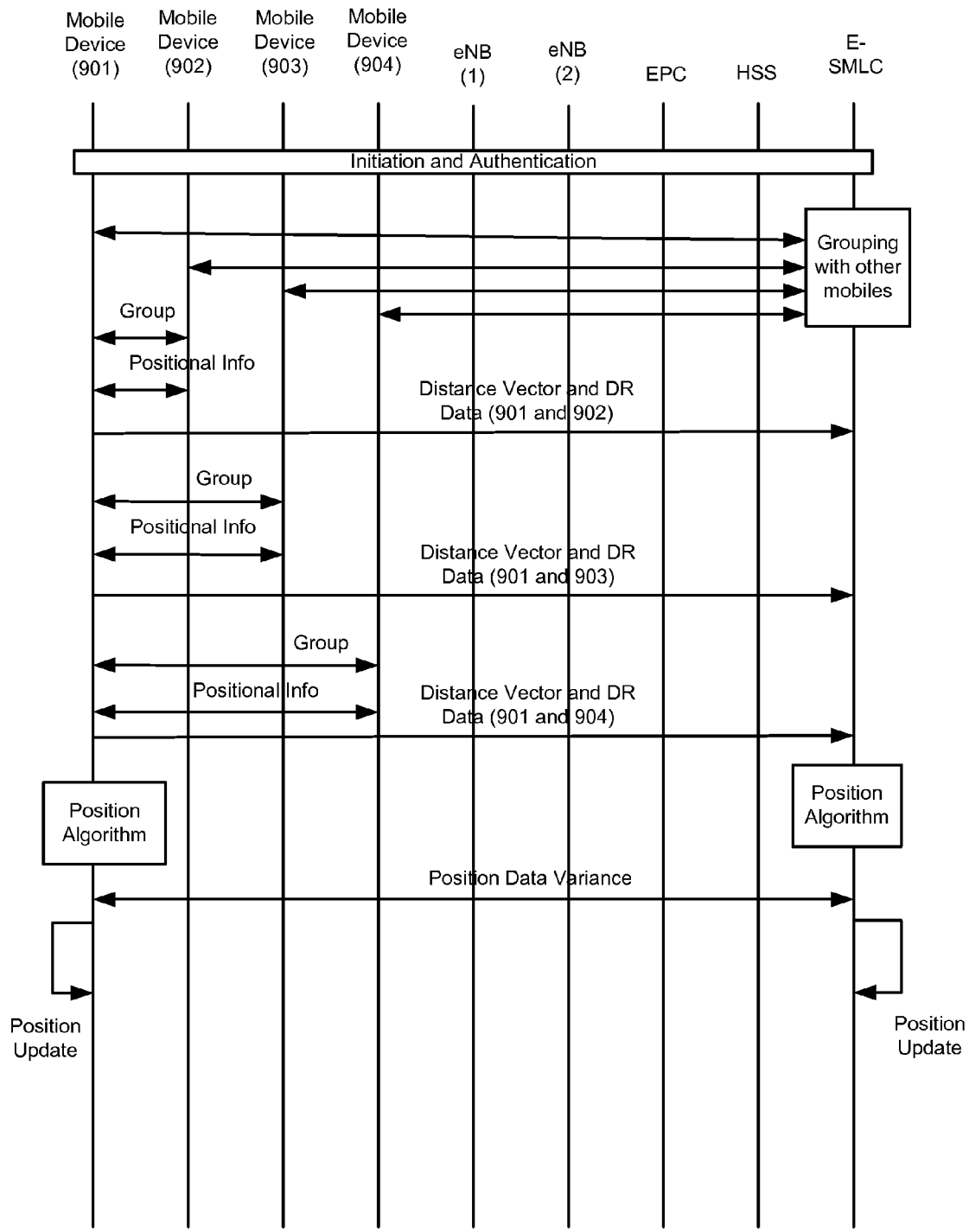
FIG. 10 is a sequence diagram illustrating an embodiment hybrid lateration method by which mobile devices may calculate position accurately with the help of the network.

FIG. 10 illustrates an embodiment hybrid lateration method 100 in which mobile devices may gain access to the network. The mobile devices may be instructed to be grouped by the network. Mobile devices 901 and 902 may initiate sharing of information for position location, either due to the network driven grouping request or when the mobile device has lost contact with the network and attempts to find a suitable mobile device to help in its position location and possible connection to the network via a relay or to another network.

Mobile device 901 may send a request for position information to mobile device 902. The information may be sent after the authentication process between mobile devices, and may include a time stamp. The time stamp may be sub seconds in size (e.g., milliseconds). The mobile device 902 may respond with a message that also has a time stamp, and timing information pertaining to when the mobile device 902 received the time stamp from mobile device 901. Three messages may be transferred quickly to establish time synchronization. The time differences may then be compared, along with possible pulses or pings, to establish an estimated distance vector between the mobile devices. Knowing the distance vector and the x, y, and z coordinates of both 901 and 902, a point-to-point fix may be established. In various embodiments, the position fix may be extrapolated to synchronize the trilateration time stamp with a time stamp of a dead reckoning calculation. Similarly, the time interval adopted for dead reckoning calculation updates may be adopted as the time interval between trilateration recalculations.

The mobile device 901 may then initiate communication with mobile devices 903, 904 and repeat the operations discussed above with respect to mobile device 902 for each of mobile device 903, 904. After obtaining two or more distance vectors along with positional information, the mobile device 901 may compare the new coordinates to its previously computed current location, and adjust the location computations accordingly.

The positional information distance vectors may be sent to the network for positional processing with other network positional information. Based on the position calculated for the mobile device, the network (i.e., a component in the network, such as a network server or E-SMLC) may instruct the mobile device to adjust its positional information.

Additionally the mobile device 901 may also make a positional correction if the network either does not respond in time, which may result in a message update time out. Alternatively, when the network cannot make the necessary correction, and the positional information may used by another component and/or other mobile devices to perform the necessary corrections.

If the error is greater than x % for a lower positional confidence level then no update is required. As the mobile receives other sensor data and more than a pre-described distance in any direction or a combined distance vector than the positional update process begins again. If the x % of positional confidence level is less than desired, additional positional updates may be made with the grouped mobile devices (e.g., iteratively) to improve the confidence level of the positional information. Additionally if the positional information from one of the mobile devices that is being attempted to obtain a distance vector appears to be in error, then that mobile devices data may be selected to not be used for this iterative step of performing positional updates with other grouped mobile devices. However it will continue to be queried as part of the process since its position location could be corrected in one of the steps it is taking to improve its position location as well.

Additionally in the event that one or more mobile devices lose communication with the core network it will still be possible to maintain position accuracy through one of the other grouped mobile devices. In some embodiments, the last position of the mobile device may be re-used and the amount of error increased. It will also be possible to continue to maintain a communication link by establishing a network relay connection with another of the mobile devices in the same group which still has communication with the network itself.

Figure 11:
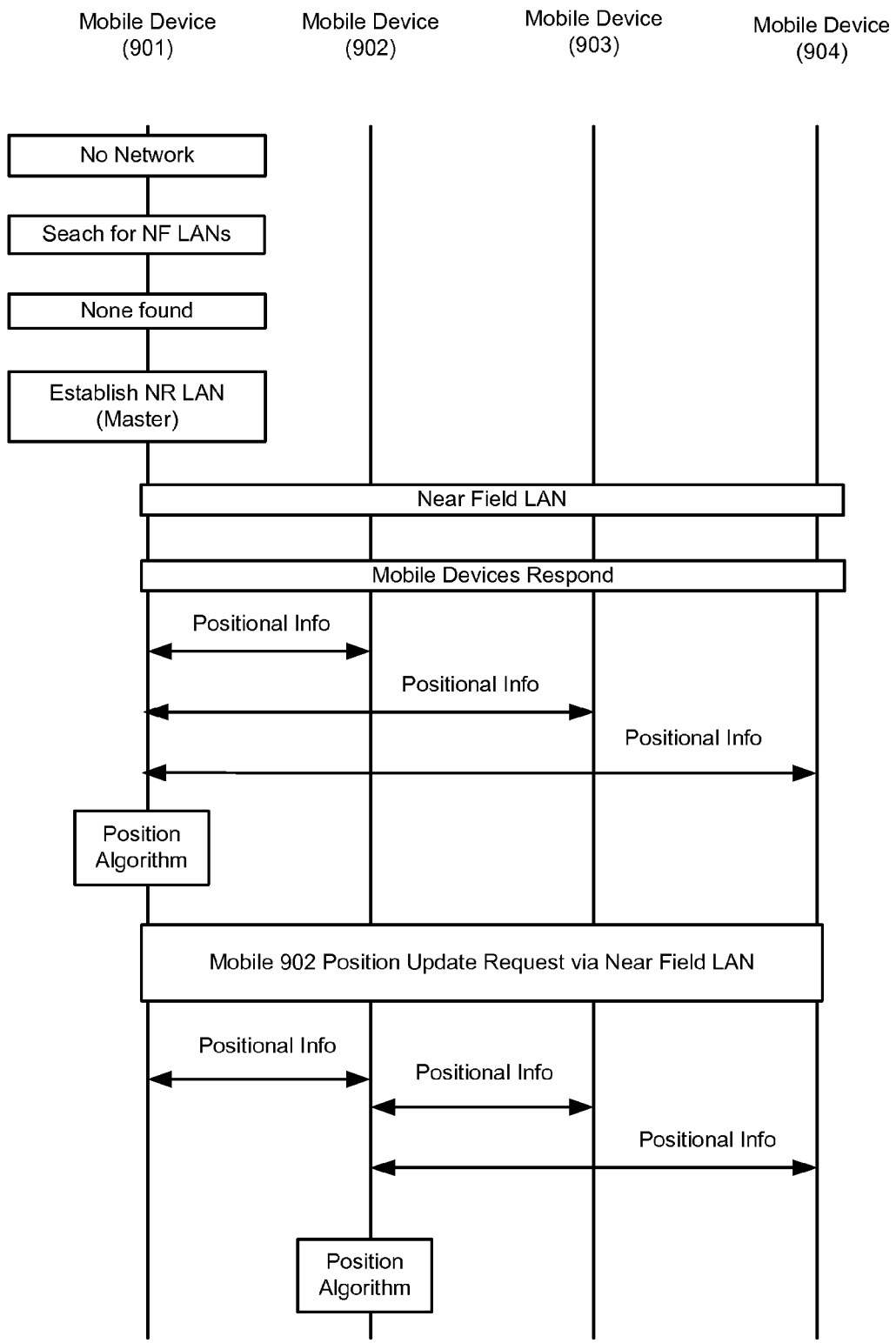
FIG. 11 is a sequence diagram illustrating another embodiment hybrid lateration method in which a mobile device cannot locate a network due coverage problems.

FIG. 11 illustrates another embodiment hybrid lateration method 100 in which a mobile device cannot locate a network due coverage problems. The mobile device 901 may operate in an autonomous mode and attempt to locate another mobile device. The other mobile device could be used to relay information to the network and possibly set up a near field communication bridge in addition to providing location enhancement capability.

In the example illustrated in FIG. 11, mobile device 901 establishes a near field LAN inviting other mobile devices in proximity to communicate with it. Positional information can then be shared and the mobile device 901 can have its location improved and the positional information can be relayed back to the core network via another mobile device.

The mobile device 901 may also communicate its positional information and establish near field communication link with a mobile device that is not part of the home network associated with mobile device 901.

The mobile devices may have the USIM, SIM, PRL or access point information pre-built in. The mobile device for first responders may have the incident radio system set as their preferred system, or in the case that the radio access system being used as a public safety network.

For first responders to utilize a wireless mobile network (e.g., LTE) the position location information accuracy needs to improved for in building environments in addition to providing more accurate location information about where the mobile devices are actually located. Whether the mobile device is used by a first responder, commercial cellular user or a combination of both.

The positional location improvement for first responders may be helpful to improve situation awareness, improved telemetry and overall communication with the incident commander. Since all incidents for first responders tend to be fluid the ability to account for a dynamic environment of mobile devices will come into and out of the incident area. In addition the mobile devices proximity location to other mobile devices can and will change as the incident situation changes where resources are added and or reassigned as the need arises for operational requirements.

The use of network and terminal driven position enhancement techniques previously discussed may be exploited. The grouping of mobile devices may be done either as part of pre-plan, with intervention by the incident commander or driven from the commercial wireless network, public safety wireless network or local incident communication system (ICS) 1204 based on reported proximity of the mobile devices.

Figure 12A:
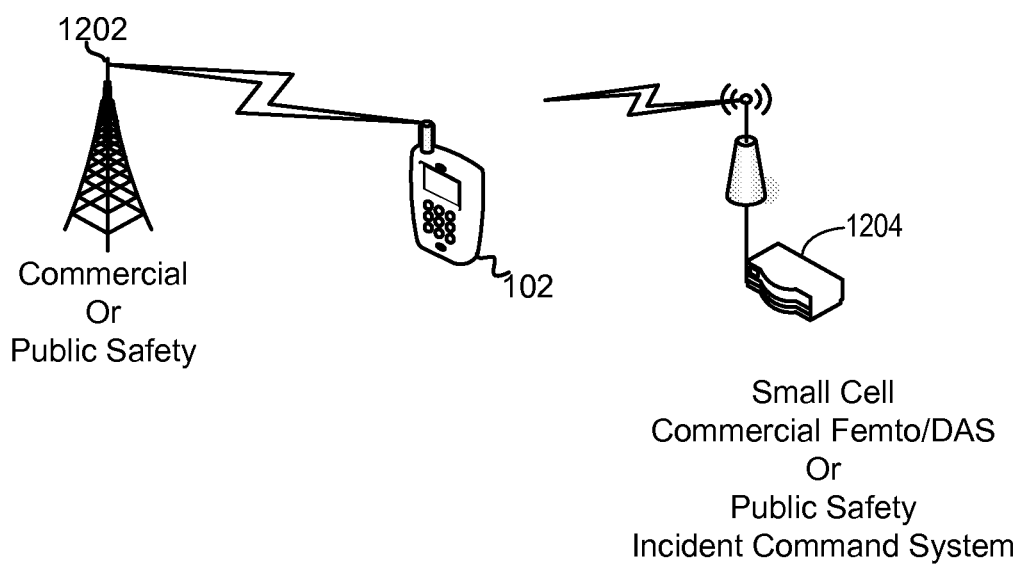
FIGS. 12A-12C are component block diagrams illustrating functional components, communication links, and information flows in an embodiment method of transferring a connection from a local radio system to the small cell system.

FIG. 12A illustrates that upon arriving at the incident scene, a mobile device 102 may recognize the existence of a local radio network 1202. If there is no ICS radio network 1204 with which the mobile device may connect, the mobile device 102 will continue to communicate via a commercial or other wireless network, 1202.

Figure 12B:
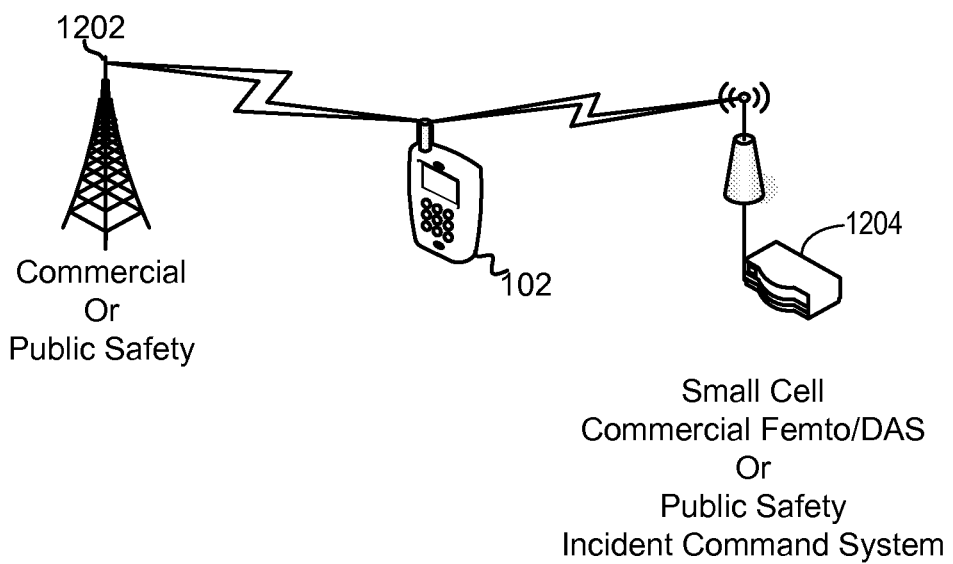

FIG. 12B illustrates that the mobile device 102 may determine that there is a valid local radio system 1202 with which it may communicate, and may have a priority access to small cell system 1204 a based on a preferred network and cell selection process the mobile device 102 has been instructed to use.

Figure 12C:
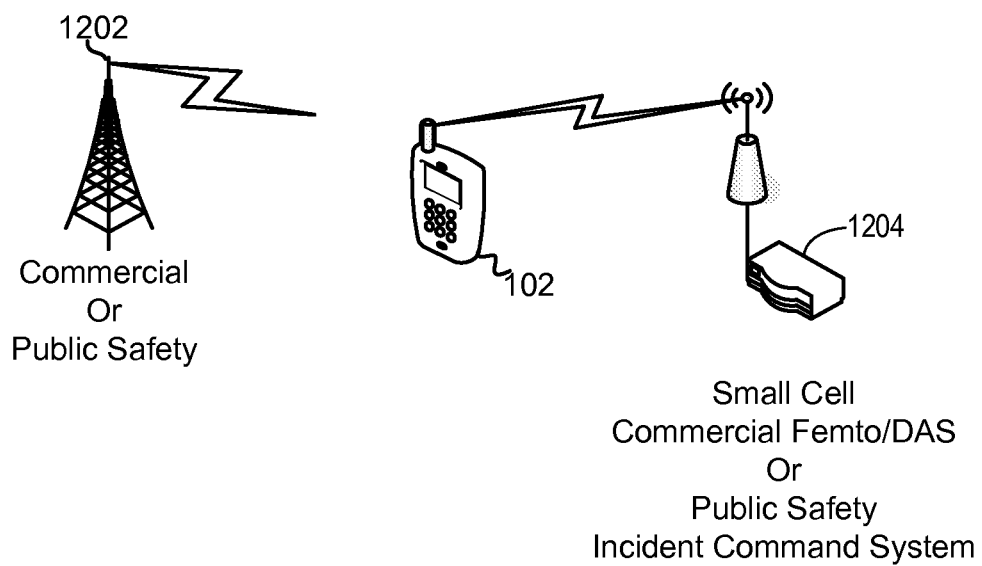

FIG. 12C illustrates that the mobile device 102 may transfer the connection from the local radio system 1202 to the small cell system 1204.

For first responders when a situation arises that requires finding a man down or responding to an emergency call (911) the location based process can be used to help in the search and rescue of the person.

Figure 13A:
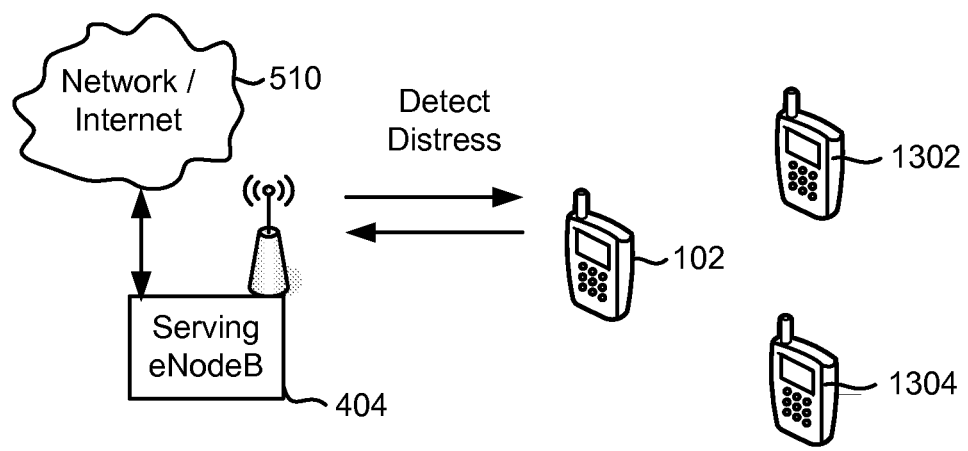
FIGS. 13A-13C are component block diagrams illustrating functional components, communication links, and information flows in an embodiment method of identifying and responding to a distressed mobile device.

FIG. 13A illustrates that the mobile device 102 may be identified by the network as being in distress via network monitoring of the mobile device 102 or via the mobile device transmitting a distress signal. The distressed mobile device 102 may determine that it has lost communication with the network, and may instruct the wearer/user to either disable or initiate a distress signal. The mobile device 102, upon initiation of a distress signal, may begin a grouping process previously defined.

Figure 13B:
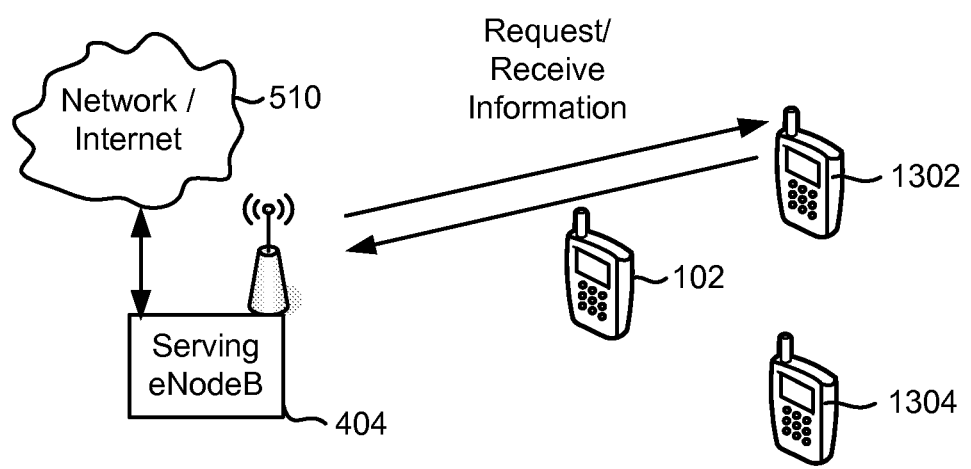

FIG. 13B illustrates that the network 510 to which the serving eNodeB 404 is connected to may instruct a mobile device 1302 in the same group as the distressed mobile device 102 to report the last known location of the mobile device 102 and time stamp.

Figure 13C:
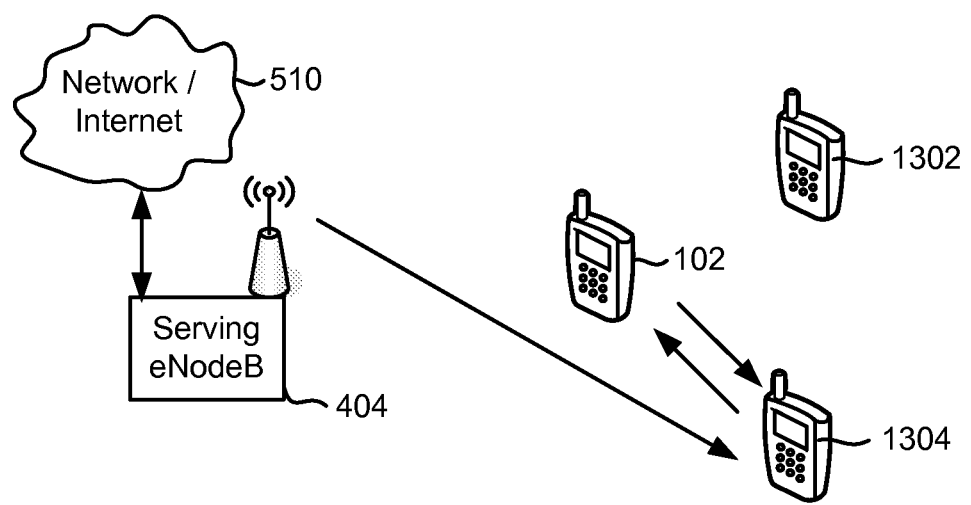

FIG. 13C illustrates that the network 510 may instruct additional mobiles devices 1304 to attempt to group with the distressed mobile device 102.

Figure 14:
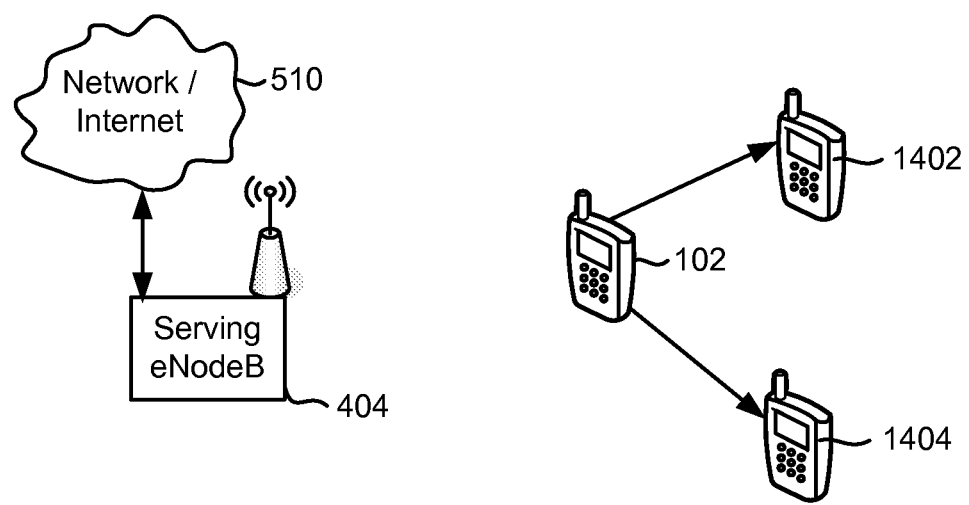
FIG. 14 is a component block diagrams illustrating functional components, communication links, and information flows in an embodiment method of performing dead reckoning grouping mobile devices in an ad-hoc scheme.

FIG. 14 illustrates that when the mobile device 102 is unable to communicate with the network 510, it may been operating under a dead reckoning process and continue to attempt to locate other mobile devices 1402, 1404 and group with them under an ad-hoc scheme.

Once the mobile device has been grouped, or is still connected to the network, the relative location of the mobile device will be sent to all the mobile devices that are in active search for that mobile device. The selection of which mobile devices will be searched may be determined by operator intervention and selection.

As discussed above, the various embodiments include methods, and mobile devices configured to implement the methods, of determining a location of a mobile device, which may include determining an approximate location of the mobile device, grouping the mobile device with a wireless transceiver (e.g., a second mobile device, etc.) that is in proximity to the mobile device to form a communication group, sending the determined approximate location of the mobile device to the wireless transceiver, receiving on the mobile device location information (e.g., a latitude coordinate, a longitude coordinate, an altitude coordinate, etc.) from the wireless transceiver, and determining a more precise location of the mobile device based on the location information received from the wireless transceiver. In an embodiment, the method may include grouping the mobile device with a plurality of wireless transceivers in proximity to the mobile device to form the communication group, and receiving location information from the plurality of wireless transceivers in the communication group. In some embodiments, the method may also include sending information relating to the determined more precise location of the mobile device and the received location information to a server, receiving updated location information from the server, and re-computing the more precise location of the mobile device based on the updated location information (i.e. the information received from the server).

As also discussed above (e.g., with reference to FIG. 8) a mobile device may be configured determine its current location using any of a number location determination solutions to produce a final location estimate, share its location information (i.e., the final location estimate) with other grouped mobile devices and/or receive location information from other grouped mobile devices, compute and send a final location estimate (and updated distance vector and sensor information) to a network component for an improved positional fix, receive updated location information from the network component, and perform its own positional fix based on mobile data information received from the network. The mobile device may then update its location information and/or confirm its location information using dead reckoning to enhance its positional accuracy.

Further embodiments include methods, and mobile computing devices configured to implement the methods, of providing an enhanced location based services. The mobile computing device may be configured to determine an initial position, generate at least one set of local position information based on locally determined location information, receive location information from one or more external location tracking systems, generate at least one set of external position information based on the location information received from the external location tracking systems, receive distance information from multiple mobile devices in a communication group, generate proximity position information based on the location information received from the multiple mobile devices in the communication group, and generate a final location estimation set (a position, velocity, and acceleration value) based on the local position information, the external position information, the proximity position information and the initial position. The mobile computing device may then use the final location estimation set to provide a location based service (e.g., an emergency location service, commercial location service, internal location service, lawful intercept location service, etc.).

Figure 15:
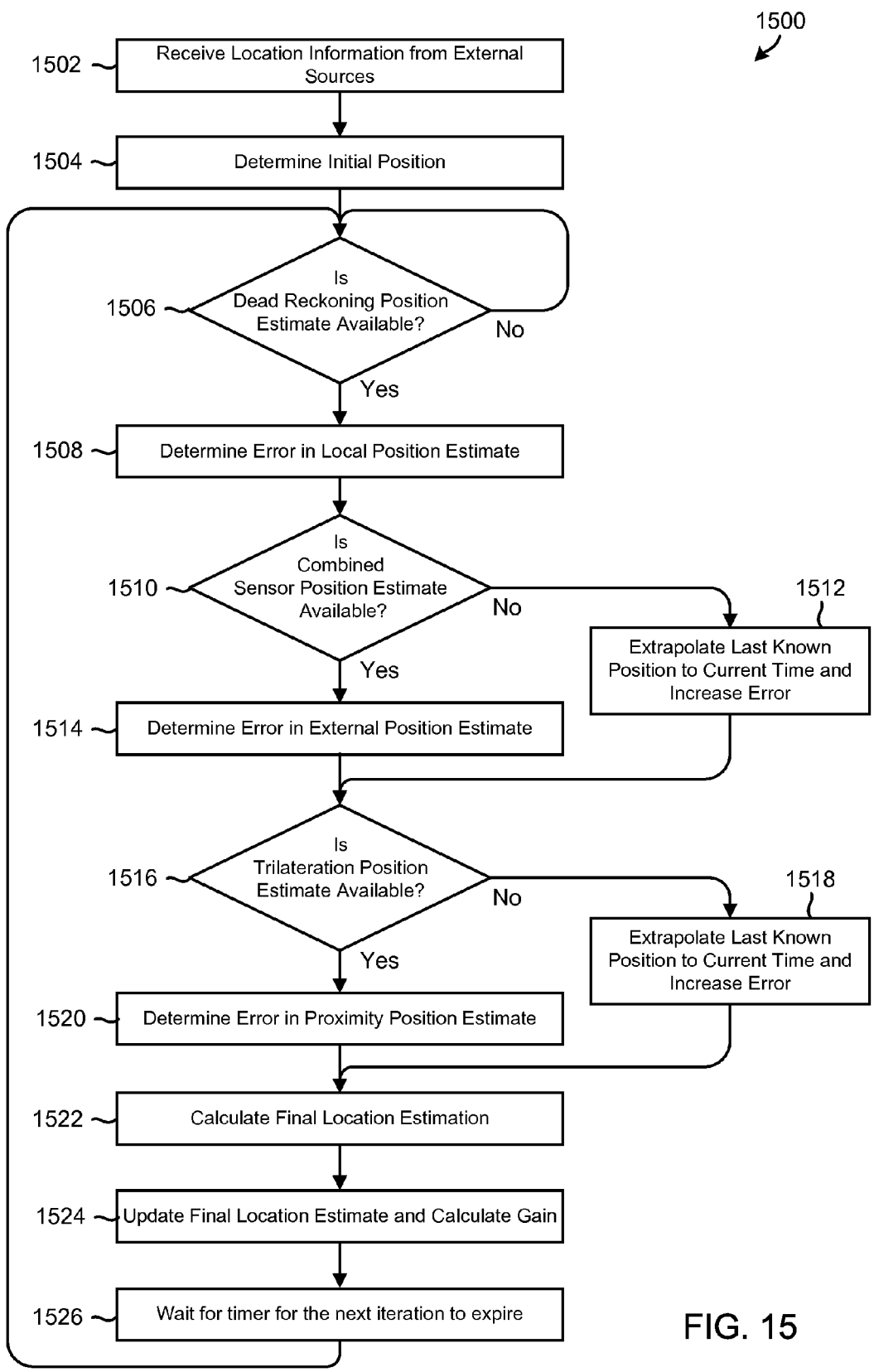
FIG. 15 is a process flow diagram illustrating an embodiment mobile device method for determining the location of a mobile device.

FIG. 15 illustrates a method 1500 of determining the location of a mobile device via a wireless network in accordance with an embodiment. The operations of method 1500 may be performed by a processor or processing core in a mobile device 102. In block 1502, the mobile device 102 may receive location information, such as GPS or cell-based location information, from one or more external systems (e.g., an external location tracking system, GPS system, a base station, a network server, etc.). In block 1504, the mobile device may determine its initial position, which may include performing any or all of the above-described location or position determination techniques, algorithms, or methods to determine or compute an initial position value. For example, the mobile device may determine its initial position (or the initial position value) based on GPS coordinates and/or GPS-determined position information received in its GPS circuitry from a GPS system.

The initial position value may be an information structure that includes one or more information fields, component vectors, location information, position information, coordinate information, etc. Similarly, the mobile device may include, generate, compute, determine or use a dead reckoning position estimate value, a combined sensor position estimate value, a trilateration position estimate value, a final location estimate value, and various temporary position and error values, any or all of which may be information structures that each include one or more information fields, component vectors, location/position information such as coordinates, and/or other similar information. In some embodiments, the mobile device may include a dead reckoning module that is configured to determine whether a dead reckoning position estimate value is available, as well as to generate time stamps, use dead reckoning techniques to compute location information, set the dead reckoning position estimate value, and/or perform other similar operations.

In some embodiments, as part of the operations in block 1504, the mobile device may determine whether GPS data (e.g., GPS coordinates or GPS determined position information) is available in the device. The mobile device may also determine, generate, or compute an temporary position value in response to determining that GPS data is not available, and set the initial position value to the determined temporary position value (e.g., by performing a deep or shallow copy of the temporary position value information structure). In various embodiments, the mobile device may determine or compute the temporary position value and/or set the initial position value to zero (0), to the last known location stored in memory, or to the RSSI or time of flight with/between another mobile device such that 0.5 of the estimated distance is applied to the horizontal component and vertical component of the reporting mobile device. In some embodiments, the mobile device may also derive, determine, or compute an initial altitude value (or generate initial altitude information) based on information reported by other or additional mobile devices, and use this initial altitude value to compute the temporary position value and/or to set the initial position value.

In determination block 1506, the mobile device may determine whether a dead reckoning position estimate value is available, which may include determining whether the device may utilize one or more dead reckoning techniques to compute or generate location information for the mobile device based on information that is stored in its memory or based on information that may be collected from its components (e.g., sensors, etc.). In response to determining that a dead reckoning position estimate value is not available (i.e., determination block 1506="No"), the mobile device may wait for a predetermined amount of time (or for the occurrence of an event, a trigger, notification, collection of data, etc.) and repeat the operations of determination block 1506. Said another way, the mobile device may wait until it determines that it has access to sufficient information to use dead reckoning techniques/methods to compute its current location and set the dead reckoning position estimate value, or until it times out, a timer expires, etc.

In response to determining that a dead reckoning position estimate value is available (i.e., determination block 1506="Yes"), the mobile device may determine, compute, or calculate an error value (e.g., in the form of a variance, etc.) that identifies the error associated with the determined local-position or dead reckoning estimate value in block 1508. In determination block 1510, the mobile device may determine whether a combined sensor position estimate value is available (e.g., is determinable from information collect from sensors or stored in memory, etc.) for the current time. In some embodiments, the mobile device may be configured to calculate/determine the inputs for computing or determining the combined sensor position estimate value by filtering the output of environmental sensors, such as the accelerometer, barometer, gyro, magnetometer and/or thermometer, and using the filtered sensor outputs as the inputs to an algorithm or method for computing the combined sensor position estimate value. In some embodiments, in block 1510, the mobile device may execute or perform a single variable kalman filter using the combined or "fused" sensor outputs to obtain, determine, or compute the combined sensor position estimate value. The single variable kalman filter may be a procedure, algorithm, method, technique, or sequence of operations for accomplishing the function of a kalman filter.

In response to determining that combined sensor position estimate is not available for the current time (i.e., determination block 1510 equals, or evaluates to, "No"), the mobile device may determine, compute, or calculate an error value (e.g., in the form of a variance value, etc.) that identifies an error/variance associated with the external position estimate in block 1512. For example, in block 1512, the mobile device may extrapolate the last available combined sensor position estimate value to fit a time stamp established or determined by the dead reckoning module of the mobile device. In some embodiments, the mobile device may be configured to increase or increment the error/variance value associated with the combined sensor position estimate value so as to compensate for a potential inaccuracy of the calculation. Said another way, the mobile device may be configured to update the combined sensor position estimate error value in block 1512 to better account for potential inaccuracies in its computations or location/position determinations.

In response to determining that combined sensor position estimate value is available for the current time (i.e., determination block 1510 equals, or evaluates to, "Yes"), the mobile device may determine an error/variance value for the external position estimate value in block 1514. Said another, in block 1514 the mobile device may determine, compute, or calculate an external position estimate error value in response to determining that a combined sensor position estimate value is available.

In determination block 1516, the mobile device may determine whether a trilateration position estimate value for a current time is available. As described above, the mobile device may obtain more accurate position information by calculating its own location based on the distance between the mobile device and three or more reference locations. Some embodiments may include obtaining distance information from several reference locations and executing a kalman filter on the obtained coordinates to produce a single estimate of position, velocity, and acceleration in block 1516. In response to determining that a trilateration position estimate value for the current time is not available (i.e., determination block 1516 equals or evaluates to "No"), in block 1518 the mobile device may extrapolate the last available trilateration location information to a current time stamp established by the dead reckoning module. In response to determining that the trilateration position estimate value for the current time is available (i.e., determination block 1516 equals or evaluates to "Yes"), the mobile device may determine the error/variance associated with the trilateration position estimate value in block 1520.

In block 1522, the mobile device may compute, calculate, or determine a final location estimate value based on the dead reckoning position estimate value, the combined sensor position estimate value, the trilateration position estimate value, and the location information received from external systems (e.g., GPS coordinates, etc.). In various embodiments, the mobile device may set the values of one or more fields in the final location estimate value to be equal to the product of executing a kalman filter on the sets of location information/values, which may include (or may be based on) a position information estimate/value, velocity information estimate/value, and an acceleration information estimate/value. In block 1524, the mobile device may update the a final location estimate value with the calculated estimate/values and/or calculate or determine a gain value.

In block 1526, the mobile device may wait for a predetermined amount of time (or wait until a time interval lapses) return to block 1516 to repeat the operations of method 1500 to begin updating the location information for the current time. In some embodiments, the time interval may be synched to the time of the dead reckoning module. Thus each subsequent updating of the dead reckoning location information may represent the beginning of another final location information recalculation.

Figure 16A:
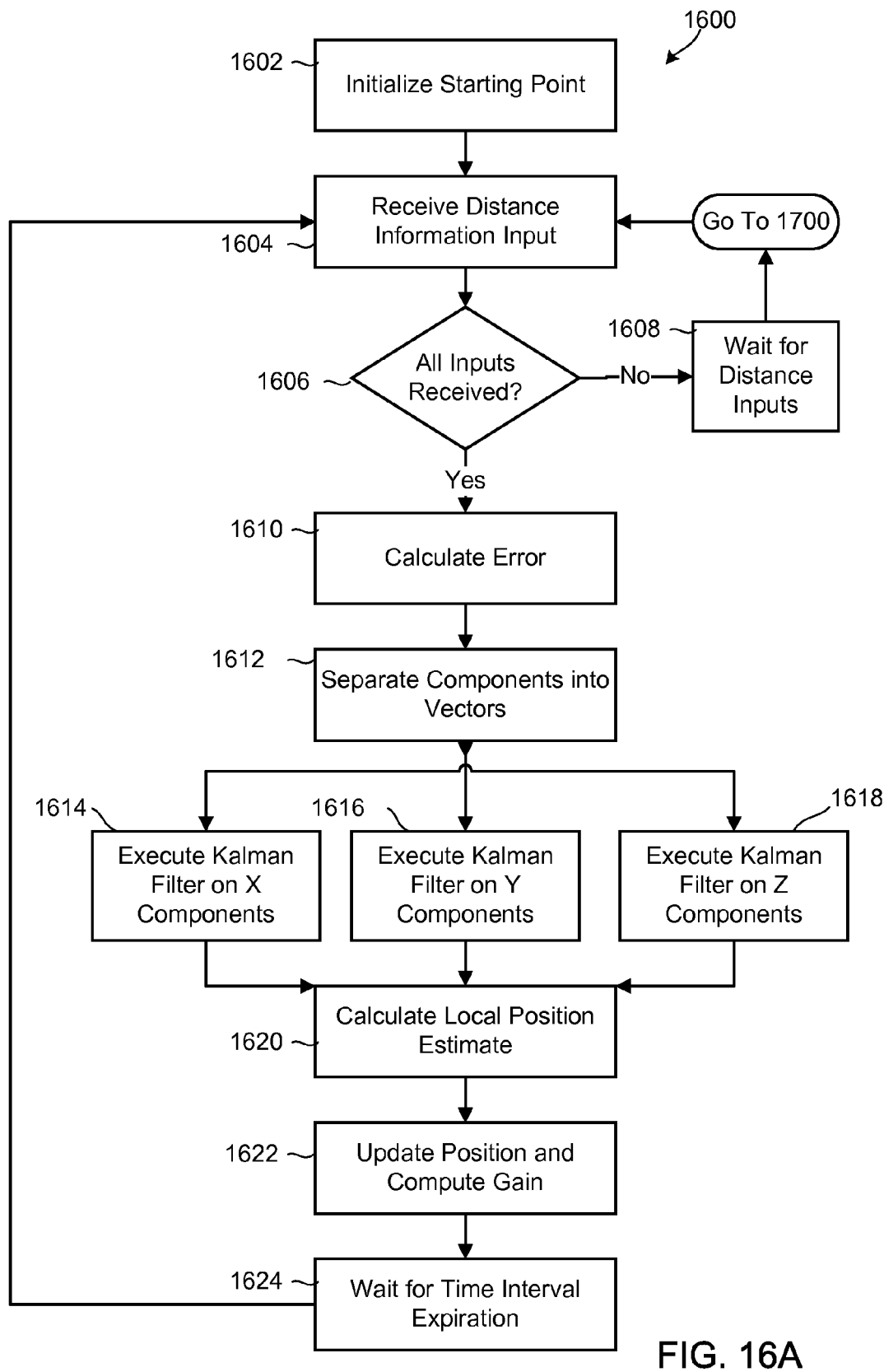
FIGS. 16A-B are process flow diagrams illustrating an embodiment methods of obtaining position information for a mobile device in a wireless network.
Figure 16B:
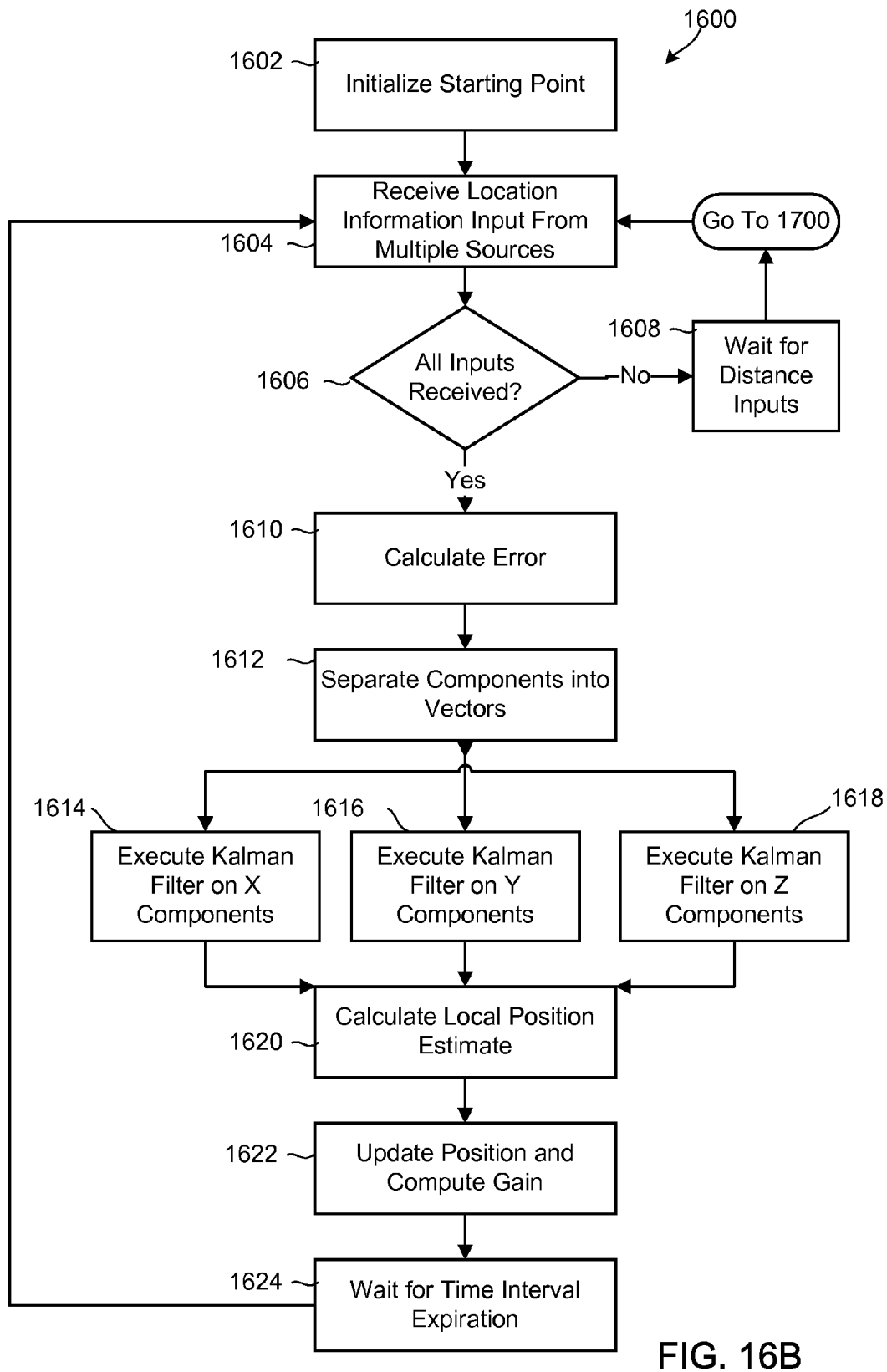

FIGS. 16A-16B illustrate embodiment mobile device methods 1600 for calculating location information estimates. The operations of method 1600 may be performed by a processor or processing core in a mobile device 102.

With reference to FIG. 16A, an embodiment method for implementing a trilateration technique may include the execution of a kalman filter on distance information to produce a more accurate location, velocity, and acceleration estimate. In block 1602 the mobile device may initialize a starting point in the same manner as described with reference to block 1502 of FIG. 15. In block 1604, the mobile device may receive location information from three or more reference locations (e.g., other mobile devices, access points, etc.) and may calculate a distance between the mobile device and each of the reference locations. The mobile device may further calculate a velocity and acceleration of the mobile device with respect to each of the reference locations. In block 1606, the mobile device may check for the presence of received inputs from at least three separate reference locations. If the mobile device has received location information from at least three reference locations then the process may proceed to block 1610. If the mobile device has not received a sufficient number of inputs from the reference locations, it may in block 1608 wait to receive further input. In some embodiments, while the mobile device waits for additional reference location information, it may update previous trilateration information according to the embodiment method 1700 described below with reference to FIG. 17.

In block 1610, the mobile device may calculate an error or variance associated with the distance calculation. In block 1612, the calculated distance information, along with the associated velocities and acceleration calculations may be separated into their directional components and grouped into vectors with like components from each reference location. For example, the calculations may be separated into Cartesian or radial coordinate components, and a z component vector may contain the z components of the distance, velocity, and acceleration information for all location information received from the at least three reference locations. In blocks 1614, 1616, and 1618, a kalman filter may be executed on each of the component vectors. In block 1620, the component vectors of all the kalman filter functions may be combined to calculate a three dimensional position estimate in the manner described with reference to embodiment method 1800 and FIG. 18.

In block 1622, the processor of the mobile device may update the trilateration position information with the estimate calculated in block 1620, and may further calculate a process gain. In block 1624, the mobile device may wait a predetermined interval of time, as established by the time stamp of the dead reckoning module, and may then return to block 1604, to begin updating the trilateration location information.

FIG. 16B illustrates an embodiment mobile device method for calculating location estimates and proceeds in the manner described with reference to FIG. 16A above, but does not receive information from reference locations. In block 1602, the mobile device may initialize a starting position for the combined sensor location information calculation. In block 1630 the mobile device may collect data generated by local sensors such as an accelerometer, barometer, gyro, magnetometer and thermometer. The various sensor outputs may include position, velocity, and acceleration information and may be utilized by the mobile device in the same manner as the trilateration inputs. In blocks 1606 through 1624, the method may proceed as described above with respect to steps 1606 through 1624 of FIG. 16A. In some embodiments, the combined sensor location information may be used as input for dead reckoning.

Figure 17:
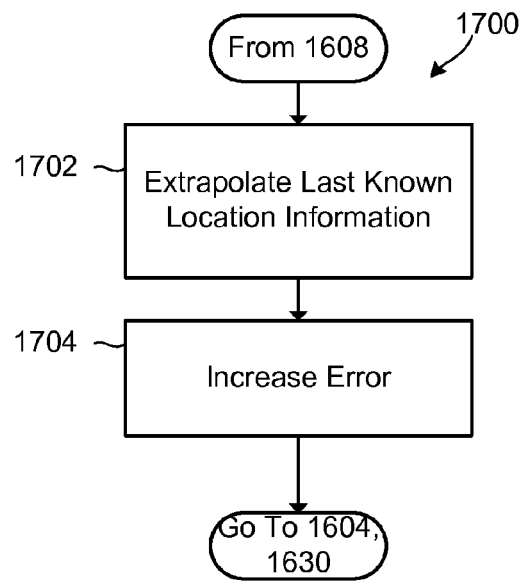
FIG. 17 is a process flow diagram illustrating an embodiment method of updating location information in the absence of new location measurements.

FIG. 17 illustrates an embodiment mobile device method for updating location information. From block 1608 of embodiment method 1600, there may be a lack of sufficient input for a given time interval to permit accurate location calculation. In block 1702, the mobile device may extrapolate a previous set of location information (e.g., position, velocity, and acceleration information) to a current time interval and, the error associated with the calculation may be increased in block 1704. The resulting location information and adjusted error may be returned to block 1604 for use in determining an updated set of location information.

Figure 18:
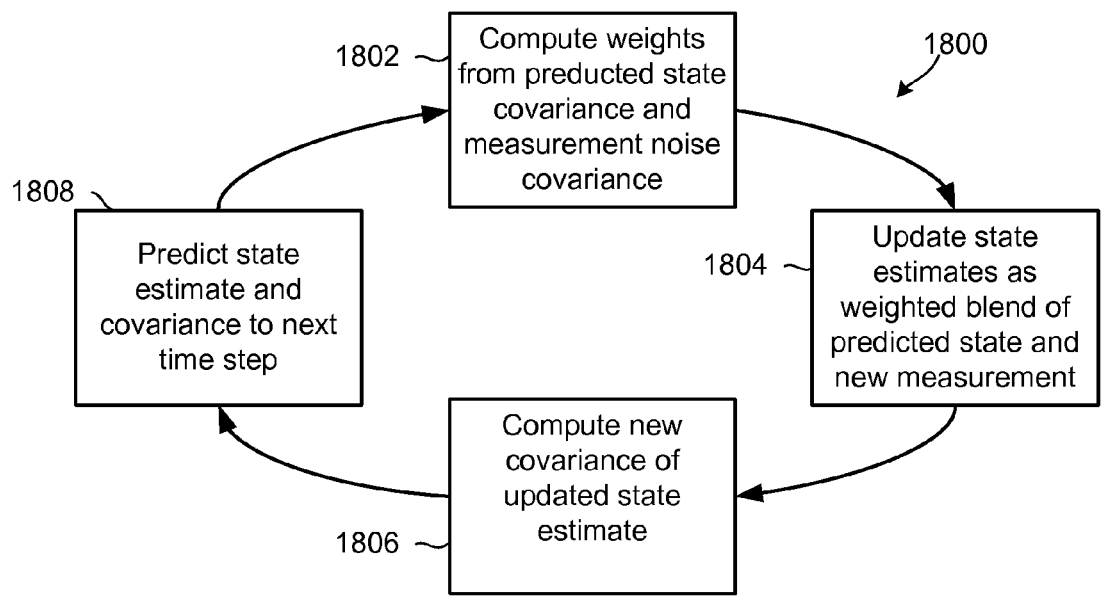
FIG. 18 is a process flow diagram illustrating an embodiment method to produce precise location information.

FIG. 18, illustrates an embodiment mobile device method of executing a recursive, linear filter on location information. Using an initialized starting position, the filter may generate a new state estimate by combining new measurements with a predicted state estimate based on the measurements of a preceding time interval. At each iteration, location estimates are produced using only the new set of measurement vectors and values stored from the previous cycle. In some embodiments, the state three measurements for each input may be stored to facilitate calculation of a three dimensional position. Through multiple iterations of the filter, process noise, such as less accurate location information is removed from the produced final location estimate.

During the filter process, the state estimate "L" may be considered to be current for a time "k" or predicted for a time "k−." The state, or location estimate may be a nine element vector including an estimated position, velocity, and acceleration for each coordinate component of a coordinate system. For example, a location estimate for a Cartesian coordinate system may be represented by the expression $$L_k = [x, y, z, v_x, v_y, v_z, a_x, a_y, a_z]$$

In various embodiments, the vector may be separated into multiple smaller vectors including all elements associated with a coordinate component, thereby enabling easy isolation of position, velocity, and acceleration information with respect to a single axis of translation. Thus, "$L_k$" may e represented by the series of expression:

$$L_{xk} = [x, v_x, a_x]$$

$$L_{yk} = [y, v_y, a_y]$$

$$L_{zk} = [z, v_z, a_z]$$

The current state "$L_k$" may depend only on the predicted state for the previous time interval, new input measurements "G" (e.g., a new location information input), a transition matrix "H" and the kalman gain "K." Thus, the current location estimate may be represented by the function:

$$L_k = L_k^- + K_k(G_k - H \cdot L_k^-)$$

To begin location estimate calculation, a starting position "$L_0$" and associated covariance "$P_0$" may be initialized using GPS coordinates or local sensor output for a position, velocity, and acceleration. The estimated covariance matrix "P" may comprise the variance of an Lvector along the diagonal and the off diagonal elements set to zero. If no sensor output location information or externally provided starting coordinates are available, the initial values may be set at either 0 or an estimated distance using RSSI and or Time of Flight (TOF) from a reference location (e.g., another mobile device), such that 0.5 of the estimated distance will be applied to the X and Y component of the reporting reference location and the altitude, Z, will use as that reported by the other reference locations.

In block 1802 an error or covariance P may be determined, along with weight factors. Block 1802 may be the end of the prediction phase of the kalman filter process and may pass a predicted location, covariance, and weights to block 1804, the beginning of the updating phase. Once the starting point is initialized the starting position may be used as a predicted measurement and may be represented by the function:

$$L_k = AL_{k-1} + Bu_k + w_{k-1}$$

Where "A" and "B" are state transition matrices that may map a state from a time "k−1" to "k. The parameter $w_{k-1}$ is a vector of elements representing the uncertainty in the noise for each of the parameters in the state vector L, and "$u_k$" is a parameter nulled out during calculation. The mean noise "w" along with a standard deviation of the noise "$v_k$" may enable convergence of location and sensor input datum, which are non-Gaussian. Current measurements "G" may be expressed as a function of the standard deviation by "$G_k = HL_k + v_k$" and alternatively as "$G_k = H \cdot L_k + R$" where "R" is a matrix representing the variance of the measurements. The estimated covariance may be represented in terms of a previous covariance estimate, the transition matrix A, and a covariance matrix "Q" and expressed by the function:

$$P_k^- = AP_{k-1}A^T + Q$$

In block 1804, updating phase may begin, and the location estimate "L" may be updated. This phase may begin by computing the Kalman gain "K" for the current time interval. The gain may be a product of the estimated covariance, and the measurement variance "R," and may thus be represented by the expression:

$$K_k = P_k^- \cdot H^T \cdot (H \cdot P_k^- \cdot H^T + R)^{-1}$$

The current location estimate may be updated using the current location estimate expression. Kalman gain depends on the current state estimate and the accuracy of the measurements. As the accuracy of the measurements increase the Kalman gain will be high placing higher weight on the measurements. In some embodiments, the time k may be larger, thus decreasing the accuracy of the measurements (due to staleness of the measurement) resulting in a low Kalman gain placing more weight on prediction than on the measurements. With a high gain, more weight will be placed on measurements than on the predicted value. In block 1806, the current covariance "P" may be computed. Over multiple iterations of the filter, the off-diagonal elements of the covariance matrix may become non-zero elements. The current process covariance may be expressed by the function:

$$P_k = (1 - K_k H) \cdot P_k^-$$

The current location "L" and a current process covariance matrix P may be the outputs of the updating phase and may be passed as input to the beginning of the prediction phase in block 1808 for the next iteration of the filter. In block 1808, the mobile device may predict the location matrix/matrices and process covariance "P" matrix for a time "k+1" may and pass them as input to the second step of the predicting phase in block 1802. The current location estimate may also be used as current position, velocity, and acceleration information for location based services, and may be passed to the network in accordance with various embodiments. In some embodiments, the current location estimate may be passed as input to a second kalman filter and combined with other location inputs to produce a final location estimate.

In various embodiments, the systems, methods, and devices may execute a kalman filter in three separate instances within the embodiment method 1500 described with reference to FIG. 15. These instances may include execution of a kalman filter on the combined sensor location information, the trilateration location information, and the final location estimate, which combines the sensor location information, trilateration location information, and all other location input sources. For each instance, the inputs must be synchronized with the time stamp used by the dead reckoning module and may be extrapolated to fit a current dead reckoning time.

In various embodiments, the mobile device may utilize a kalman filter process to determine accurate location information for a mobile device. Multiple kalman filters may be executed on location information from varied sources. The output of filtering location information from multiple sources may be input for a final stage kalman filter process that may reduce the noise of inaccurate location information by recursively combining and estimating the combination of location information from different sources to produce a final location estimate.

Figure 19:
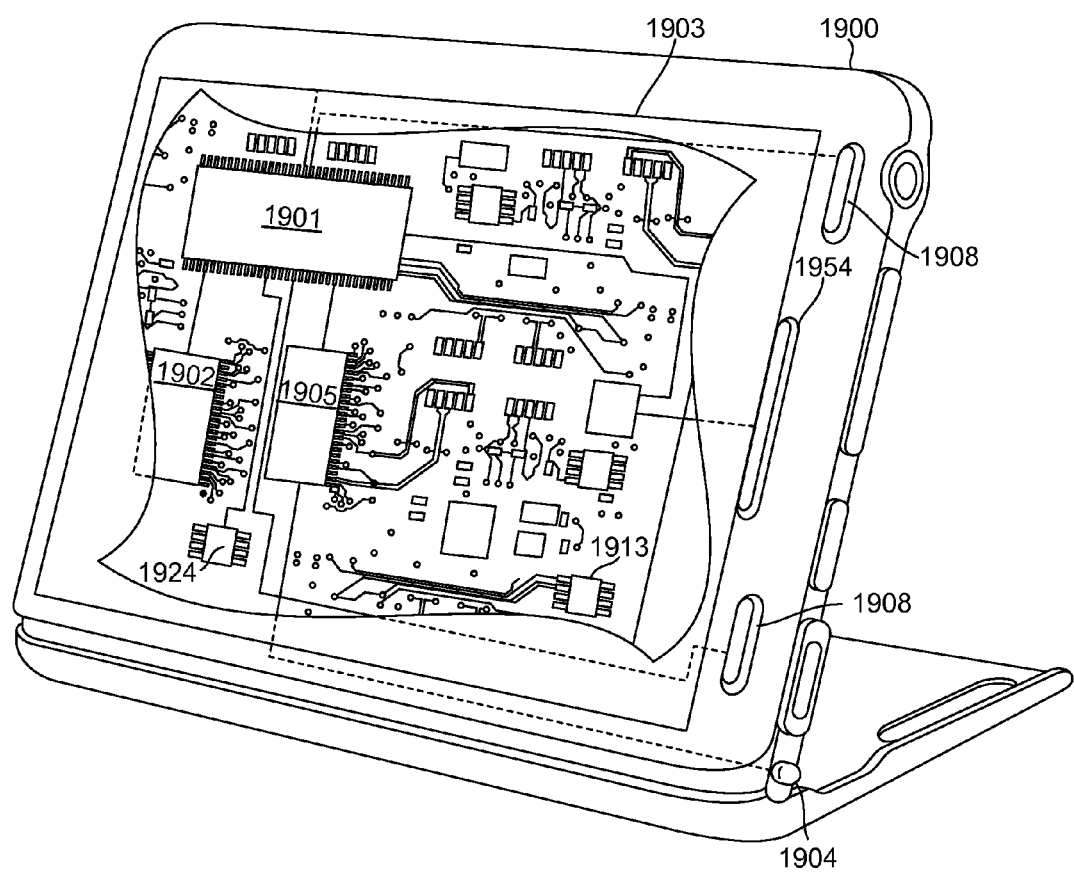
FIG. 19 is a component block diagram of a mobile device suitable for use with an embodiment.

The various embodiments may be implemented on a variety of mobile computing devices, an example of which is illustrated in FIG. 19. Specifically, FIG. 19 is a system block diagram of a mobile transceiver device in the form of a smartphone/cell phone 1900 suitable for use with any of the embodiments. The cell phone 1900 may include a processor 1901 coupled to internal memory 1902, a display 1903, and to a speaker 1954. Additionally, the cell phone 1900 may include an antenna 1904 for sending and receiving electromagnetic radiation that may be connected to a wireless data link and/or cellular telephone transceiver 1905 coupled to the processor 1901. Cell phones 1900 typically also include menu selection buttons or rocker switches 1908 for receiving user inputs.

A typical cell phone 1900 also includes a sound encoding/decoding (CODEC) circuit 1924 which digitizes sound received from a microphone into data packets suitable for wireless transmission and decodes received sound data packets to generate analog signals that are provided to the speaker 1954 to generate sound. Also, one or more of the processor 1901, wireless transceiver 1905 and CODEC 1924 may include a digital signal processor (DSP) circuit (not shown separately). The cell phone 1900 may further include a peanut or a ZigBee transceiver (i.e., an IEEE 802.15.4 transceiver) 1913 for low-power short-range communications between wireless devices, or other similar communication circuitry (e.g., circuitry implementing the Bluetooth® or WiFi protocols, etc.).

Figure 20:
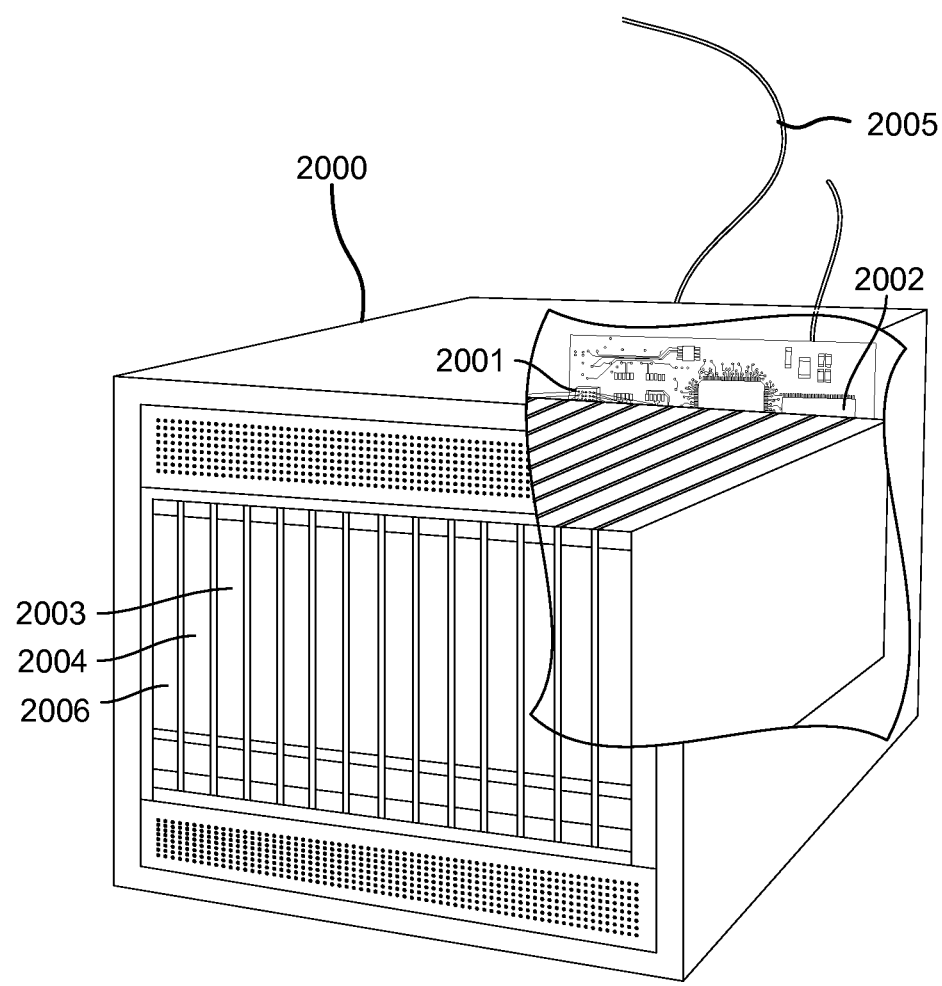
FIG. 20 is a component block diagram of a server suitable for use with an embodiment.

Various embodiments may be implemented on any of a variety of commercially available server devices, such as the server 2100 illustrated in FIG. 20. Such a server 2000 typically includes one or more processors 2001, 2002 coupled to volatile memory 2003 and a large capacity nonvolatile memory, such as a disk drive 2004. The server 2000 may also include a floppy disc drive, compact disc (CD) or DVD disc drive 2006 coupled to the processor 2001. The server 2000 may also include network access ports 2006 coupled to the processor 2001 for establishing data connections with a network 2005, such as a local area network coupled to other communication system computers and servers.

The processors 1901, 2001, and 2002 may be any programmable microprocessor, microcomputer or multiple processor chip or chips that can be configured by software instructions (applications) to perform a variety of functions, including the functions of the various embodiments described below. In some mobile devices, multicore processors 2002 may be provided, such as one processor core dedicated to wireless communication functions and one processor core dedicated to running other applications. Typically, software applications may be stored in the internal memory 1902, 2003, and 2004 before they are accessed and loaded into the processor 1901, 2001, and 2002. The processor 1901, 2001, and 2002 may include internal memory sufficient to store the application software instructions.

The wireless device location determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Frequency Division Multiple Access (FDMA) network, a Time Division Multiple Access (TDMA) network, an OFDMA network, a 3GPP LTE network, a WiMAX (IEEE 802.16) network, and so on. A CDMA network may implement one or more radio access technologies (RATs) such as CDMA2000, Wideband-CDMA (W-CDMA), and so on. CDMA2000 includes IS-95, IS-2000, and IS-856 standards. W-CDMA is described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN, and/or WPAN.

The various embodiments may include enhancements to the current location based service methodologies used for wireless mobile communications. Determining the location of the mobile device in a wireless network is becoming more and more important in recent years both for commercial and public safety positioning applications. Services and applications based on accurate knowledge of the location of a mobile device are becoming more prevalent in the current and future wireless communication systems Additionally Public Safety is also embarking on the use of commercial cellular technology, LTE, as a communication protocol of choice. Of specific importance is the need for improved situation awareness at an incident with first responders.

Presently GPS provides a good estimate of the mobile devices current location under optimum conditions. However in many situations and especially in building and urban environments the ability to utilize GPS for position location determination is hampered and many times is not usable. The network based solutions for determining the mobile devices location, while good, has many problems with locating the mobile device within buildings and in urban areas. The introduction of wireless network systems such as the third generation partnership project (3GPP) long-term evolution (LTE) present new capabilities has the ability in the public safety band to provide excellent coverage in urban and indoor environments. Although the wireless mobile networks can provide coverage in urban and in-building environments the location information position accuracy has limitations.

Better positional location accuracy and confidence has many advantages for use in emergency location services, commercial location services, internal location services and lawful intercept location services. The various embodiments provide the ability to improve the positional location information for both new and existing wireless networks.

For commercial applications the ability to have the mobile device improve location specific information within a multiple story building, in an urban environment or within a mall provides both network radio resource improvements and has unique advertising targeting capabilities as well as applications for improved fleet management, asset tracking and various machine to machine communications applications where positional determination is required to be highly accurate. For commercial users the need for improves position location information accuracy is most needed for in-building environments where the location of the mobile device can be more accurately pin pointed for location based services The advantage of law enforcement with improved positional information will enable the tracking of mobile devices inside a building to enable determination of what floor or part of the building the device is being used is located without the need for replacing radio beacons or location aware access points.

For emergency services the advantage comes to better positional location of the part in need of assistance especially in an urban environment where the positional information is most problematic with existing techniques.

For first responders this enhancement enables mobile devices which are in the same scene to help augment their position coordinates with each other in a controlled ad-hoc environment. The positional information shared not only includes latitude and longitude but also altitude and velocity. Since this information involves a small amount of data the mobile devices can have the E-SMLC in the case of LTE share the information both on net and off-net.

The use of sensors including accelerometers, gyroscopes, magnetometers and pressure sensors along with GPS receivers with mobile devices is becoming more prevalent. Therefore the enhancements for positional location will give the E-SMLC in the case of LTE the ability to not only utilize GPS or Network derived coordinate information but also to have an augmentation with sensors associated the mobile device which can include accelerometers, gyroscopes, magnetometer and pressure sensors for refining and reducing some of the positional uncertainties that are in inherent to wireless positional determination.

Wireless mobile network like LTE the position location information accuracy needs to be improved for in building environments in addition to providing more accurate location information about where the mobile devices are actually located. Whether the mobile device is used by a first responder, commercial cellular user or a combination of both.

Positional location improvement enable improved situation awareness, improved telemetry, and improved overall communication with the incident commander. In addition, the mobile devices proximity location to other mobile devices can and will change dynamically allowing for resources to be added and/or reassigned as the need arises for operational requirements.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of providing an enhanced location based service via a mobile device, including:
    determining, by a processor of the mobile device, an initial position of the mobile device;
    generating local position information;
    generating external position information based on location information received from an external location tracking system;
    generating proximity position information based on distance information received from a second mobile device;
    generating final location information based on the determined initial position, the generated local position information, the generated external position information, and the generated proximity position information; and
    using the generated final location information to provide a location based service.

2. The method of claim 1, wherein generating the final location information based on the determined initial position, the generated local position information, the generated external position information, and the generated proximity position information comprises:

generating a position information set, a velocity information set, and an acceleration information set, each of which include a latitude component, a longitude component, and an altitude component.

3. The method of claim 2, wherein generating any of the local position information, the external position information, or the proximity position information further comprises:
separating location information into a set of latitude components, a set of longitude components, and a set of altitude components; and
executing a kalman filter on each of the set of latitude components, the set of longitude components, and the set of altitude components to produce position information.

4. The method of claim 3, further comprising determining an error associated with generation of the position information.

5. The method of claim 1, further comprising:
updating the local position information after a first time interval to produce updated local position information;
updating the external position information after a second time interval to produce updated external position information; and
updating the proximity position information after a third time interval to produce updated proximity position information.

6. The method of claim 5, further comprising:
updating the generated final location information based on the updated local position information, the updated external position information, the updated proximity position information and the generated final location information to produce an updated final location estimation set.

7. The method of claim 5, wherein updating any of the local position information, the external position information, or the proximity position information comprises:
determining whether updated location information or updated distance information is available;
combining current location information or current distance information with an error value, in response to determining that updated location information or updated distance information is not available.

8. The method of claim 5, wherein the first time interval, the second time interval, or the third time interval is a time interval between successive determinations of the local position information.

9. The method of claim 1, wherein the distance information comprises a distance from the mobile device to the second mobile device.

10. The method of claim 1, wherein the local position information is obtained using dead reckoning.

11. The method of claim 1, wherein the local position information is obtained using combination of local sensor outputs.

12. The method of claim 1, wherein the external location tracking system comprise a global positioning (GPS).

13. A mobile device comprising:
an antenna;
one or more processors or processor cores configured with processor-executable instructions to perform operations comprising:
determining an initial position of the mobile device;
generating local position information;
generating external position information based on location information received from an external location tracking system and
generating proximity position information based on distance information received via the antenna from a second mobile device;
generating final location information based on the determined initial position, the generated local position information, the generated external position information, and the generated proximity position information; and
using the generated final location information to provide a location based service.

14. The mobile device of claim 13, wherein the one or more processors or processor cores is further configured with processor-executable instructions to perform operations comprising such that generating the final location information comprises generating a position information set, a velocity information set, and an acceleration information set, each of which include a latitude component, a longitude component, and an altitude component.

15. The mobile device of claim 14, wherein the one or more processors or processor cores is further configured with processor-executable instructions to perform operations comprising such that generating any of the local position information, the external position information, or proximity position information further comprises:
separating location information into a set of latitude components, a set of longitude components, and a set of altitude components; and
executing a kalman filter on each of the set of latitude components, the set of longitude components, and the set of altitude components to produce position information.

16. The mobile device of claim 15, wherein the one or more processors or processor cores is further configured with processor-executable instructions to perform operations comprising: determining an error associated with generation of the position information.

17. The mobile device of claim 13, wherein the one or more processors or processor cores is further configured with processor-executable instructions to perform operations further comprising:
updating the local position information after a first time interval to produce updated local position information;
updating the external position information after a second time interval to produce updated external position information; and
updating the proximity position information after a third time interval to produce updated proximity position information.

18. The mobile device of claim 17, wherein the one or more processors or processor cores is further configured with processor-executable instructions to perform operations comprising:
updating the generated final location information based on the updated local position information, the updated external position information, the updated proximity position information and the generated final location information to produce an updated final location information.

19. The mobile device of claim 17, wherein the one or more processors or processor cores is further configured with processor-executable instructions to perform operations comprising such that updating any of the local position information, the external position information, or the proximity position information comprises:
determining whether updated location information or updated distance information is available;
combining current location information or current distance information with an error value, in response to determining that updated location information or updated distance information is not available.

20. The mobile device of claim 17, wherein the one or more processors or processor cores is further configured with processor-executable instructions to perform operations comprising such that the first time interval, the second time interval, or the third time interval is a time interval between successive determinations of the local position information.

21. The mobile device of claim 13, wherein the one or more processors or processor cores is further configured with processor-executable instructions to perform operations comprising such that the distance information comprises a distance from the mobile device to the second mobile device.

22. The mobile device of claim 13, wherein the one or more processors or processor cores is further configured with processor-executable instructions to perform operations comprising such that local position information is obtained using dead reckoning.

23. The mobile device of claim 13, wherein the one or more processors or processor cores is further configured with processor-executable instructions to perform operations comprising such that the local position information is obtained using combination of local sensor outputs.

24. The mobile device of claim 13, wherein the one or more processors or processor cores is further configured with processor-executable instructions to perform operations comprising such that the external location tracking system comprise a global positioning (GPS).

25. A non-transitory processor-readable medium having stored thereon processor-executable software instructions to cause a processor of a mobile device to perform operations comprising:
determining an initial position of the mobile device;
generating local position information;
generating external position information based on location information received from an external location tracking system and
generating proximity position information based on distance information received via an antenna, from a second mobile device;
generating final location information based on the determined initial position, the generated local position information, the generated external position information, and the generated proximity position information; and
using the generated final location information to provide a location based service.

26. The non-transitory processor-readable medium of claim 25, wherein the stored processor-executable instructions are configured to cause a processor to perform operations such that generating the final location information comprises generating a position information set, a velocity information set, and an acceleration information set, each of which include a latitude component, a longitude component, and an altitude component.

27. The non-transitory processor-readable medium of claim 26, wherein the stored processor-executable instructions are configured to cause a processor to perform operations such that generating any of the local position information, the external position information, or the proximity position information further comprises:
separating location information into a set of latitude components, a set of longitude components, and a set of altitude components; and
executing a kalman filter on each of the set of latitude components, the set of longitude components, and the set of altitude components to produce position information.

28. The non-transitory processor-readable medium of claim 27, wherein the stored processor-executable instructions are configured to cause a processor to perform operations further comprising:
determining an error associated with generation of the position information.

29. The non-transitory processor-readable medium of claim 25, wherein the stored processor-executable instructions are configured to cause a processor to perform operations such that:
updating the local position information after a first time interval to produce updated local position information;
updating the external position information after a second time interval to produce updated external position information; and
updating the proximity position information after a third time interval to produce updated proximity position information.

30. The non-transitory processor-readable medium of claim 29, wherein the stored processor-executable instructions are configured to cause a processor to perform operations such that:
updating the generated final location information based on the updated local position information, the updated external position information, the updated proximity position information and the generated final location information to produce an updated final location information.

31. The non-transitory processor-readable medium of claim 30, wherein the stored processor-executable instructions are configured to cause a processor to perform operations such that updating any of the local position information, the external position information, or the proximity position information comprises:
determining if updated location information or updated distance information is available;
combining current location information or current distance information with an error value, in response to determining that updated location information or updated distance information is not available.

32. The non-transitory processor-readable medium of claim 30, wherein the stored processor-executable instructions are configured to cause a processor to perform operations such that the first time interval, the second time interval, or the third time interval is a time interval between successive determinations of the local position information.

33. The non-transitory processor-readable medium of claim 25, wherein the stored processor-executable instructions are configured to cause a processor to perform operations such that the distance information comprises information identifying a distance from the mobile device to the second mobile device.

34. The non-transitory processor-readable medium of claim 25, wherein the stored processor-executable instructions are configured to cause a processor to perform operations such that the local position information is obtained using dead reckoning.

35. The non-transitory processor-readable medium of claim 25, wherein the stored processor-executable instructions are configured to cause a processor to perform operations such that the local position information is obtained using combination of local sensor outputs.

36. The non-transitory processor-readable medium of claim 25, wherein the stored processor-executable instructions are configured to cause a processor to perform operations such that receiving external information from the external location tracking system comprises receiving external information from a global positioning (GPS).

* * * * *